US012626420B2

(12) United States Patent

Azarian Yazdi et al.

(10) Patent No.: US 12,626,420 B2
(45) Date of Patent: May 12, 2026

(54) SEGMENTATION FREE GUIDANCE IN DIFFUSION MODELS

(71) Applicant: QUALCOMM Incorporated, San Diego, CA (US)

(72) Inventors: Kambiz Azarian Yazdi, San Diego, CA (US); Fatih Murat Porikli, San Diego, CA (US); Qiqi Hou, San Diego, CA (US); Debasmit Das, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 152 days.

(21) Appl. No.: 18/511,692

(22) Filed: Nov. 16, 2023

(65) Prior Publication Data

US 2025/0166236 A1 May 22, 2025

(51) Int. Cl.
| | |
|---|---|
| *G06T 11/00* | (2006.01) |
| *G06F 40/284* | (2020.01) |
| *G06T 5/70* | (2024.01) |

(52) U.S. Cl.
CPC ............ *G06T 11/00* (2013.01); *G06F 40/284* (2020.01); *G06T 5/70* (2024.01); *G06T 2200/24* (2013.01)

(58) Field of Classification Search
CPC ....... G06T 11/00; G06T 5/70; G06T 2200/24; G06F 40/284
See application file for complete search history.

(56) References Cited

U.S. PATENT DOCUMENTS

| | | | | |
|---|---|---|---|---|
| 2024/0232580 | A1* | 7/2024 | Jaegle | G06N 3/084 |
| 2024/0331236 | A1* | 10/2024 | Li | G06T 5/60 |
| 2024/0355022 | A1* | 10/2024 | Shi | G06T 9/00 |
| 2024/0404144 | A1* | 12/2024 | Aggarwal | G06N 3/045 |
| 2025/0117967 | A1* | 4/2025 | Tambi | G06F 40/166 |
| 2025/0117973 | A1* | 4/2025 | Chen | G06T 11/60 |

FOREIGN PATENT DOCUMENTS

CN          117056540 A     11/2023

OTHER PUBLICATIONS

Karn et al.; "Image Synthesis Using GANs and Diffusion Models," 2023 IEEE International Conference on Contemporary Computing and Communications (InC4), Bangalore, India, 2023, pp. 1-6; Date of Conference: Apr. 21-22, 2023; Date Added to IEEE Xplore: Sep. 29, 2023 (Year: 2023).*

(Continued)

*Primary Examiner* — Edward Martello
(74) *Attorney, Agent, or Firm* — QUALCOMM Incorporated; Espartaco Diaz Hidalgo

(57) ABSTRACT

Certain aspects of the present disclosure provide techniques for generating an output image based on a text prompt. A method may include receiving the text prompt; providing a user interface comprising one or more input elements associated with one or more words of the text prompt; receiving input corresponding to at least one of the one or more input elements, the input indicating a semantic importance for each of at least one of the one or more words associated with the at least one of the one or more input elements; and generating the output image based on the text prompt and the input.

30 Claims, 21 Drawing Sheets

(56) References Cited

OTHER PUBLICATIONS

Chefer H., et al., "Attend-and-Excite: Attention-Based Semantic Guidance for Text-to-Image Diffusion Models", arxig.org, Cornell University Library, 201 Olin Library Cornell University Ithaca, NY 14853, ACM Transactions on Graphics, vol. 42, No. 4, Article 1, Publication date Aug. 2023, XP091523718, arXiv:2301.13826v2 [cs.CV] May 31, 2023, 24 Pages, Abstract p. 1-p. 4, Figures 1,3 p. 10, col. 1.

International Search Report and Written Opinion—PCT/US2024/052908—ISA/EPO—Feb. 4, 2025.

Rombach R., et al., "High-Resolution Image Synthesis with Latent Diffusion Models", arxiv.org, Cornell University Library, 201 Olin Library Cornell University Ithaca, NY 14853, arXiv: 2112.10752v2 [cs.Cv], XP091196342, Apr. 13, 2022, pp. 1-45, Abstract.

Bansal A., et al., "Cold Diffusion: Inverting Arbitrary Image Transforms Without Noise", arXiv:2208.09392v1 [cs.CV], Aug. 19, 2022, pp. 1-22.

Bansal A., et al., "Universal Guidance for Diffusion Models", arXiv:2302.07121v1 [cs.CV], Feb. 14, 2023, pp. 1-15.

Chung H., et al., "Diffusion Posterior Sampling for General Noisy Inverse Problems", arXiv:2209.14687v3 [stat.ML], Feb. 27, 2023, pp. 1-30.

Chung H., et al., "Improving Diffusion Models for Inverse Problems using Manifold Constraints", arXiv:2206.00941v2 [cs.LG], Oct. 3, 2022, pp. 1-28.

Dhariwal P., et al., "Diffusion Models Beat GANs on Image Synthesis", arXiv:2105.05233v4 [cs.LG], Jun. 1, 2021, pp. 1-44.

Dieleman S., "Diffusion Models are Autoencoders", sander.ai, Jan. 31, 2022, pp. 1-11.

Dieleman S., "Guidance—A Cheat Code for Diffusion Models", sander.ai, May 26, 2022, pp. 1-13.

Graikos A., et al., "Diffusion Models as Plug and Play Priors", arXiv:2206.09012v3 [cs.LG], Jan. 8, 2023, pp. 1-22.

Ho J., et al., "Classifier-Free Diffusion Guidance", arXiv:2207.12598v1 [cs.LG], Jul. 26, 2022, pp. 1-14.

Ho J., et al., "Denoising Diffusion Probabilistic Models", 34th Conference on Neural Information Processing Systems, 2020, pp. 1-12.

Kawar B., et al., "Denoising Diffusion Restoration Models", arXiv:2201.11793v3 [eess.IV], Oct. 12, 2022, pp. 1-32.

Lugmayr A., et al., "RePaint: Inpainting using Denoising Diffusion Probabilistic Models", arXiv:2201.09865v4 [cs.CV], Aug. 31, 2022, pp. 1-25.

Mongaras G., et al., "Diffusion Models—DDPMs, DDIMs, and Classifier Free Guidance", Better Programming, Accessed on Nov. 16, 2023, pp. 1-45.

Nichol A., et al., "GLIDE: Towards Photorealistic Image Generation and Editing with Text-Guided Diffusion Models", arXiv:2112.10741v3 [cs.CV], Mar. 8, 2022, 20 Pages.

Radford A., et al., "Learning Transferable Visual Models From Natural Language Supervision", arXiv:2103.00020v1 [cs.CV], Feb. 26, 2021, pp. 1-48.

Rombach R., et al., "High-Resolution Image Synthesis with Latent Diffusion Models Robin", IEEE Explore, CVF, Dec. 20, 2021, pp. 10684-10695.

Sohl-Dickstein J., et al., "Deep Unsupervised Learning using Nonequilibrium Thermodynamics", arXiv:1503.03585v8 [cs.LG], Nov. 18, 2015, pp. 1-18.

Song Y., et al., "Generative Modeling by Estimating Gradients of the Data Distribution", arXiv:1907.05600v3 [cs.LG], Oct. 10, 2020, pp. 1-23.

Wang W., et al., "Semantic Image Synthesis via Diffusion Models", arXiv:2207.00050v2 [cs.CV], Nov. 22, 2022, 16 Pages.

Wang Y., et al., "Zero-Shot Image Restoration Using Denoising Diffusion Null-Space Model", arXiv:2212.00490v2 [cs.CV], Dec. 7, 2022, pp. 1-31.

Whang J., et al., "Deblurring via Stochastic Refinement", arXiv:2112.02475v2 [cs.CV], Dec. 28, 2021, pp. 1-28.

* cited by examiner

600H

102

110

108

Submit

106

104

632

634

0

A woman and a dog at a train station

602

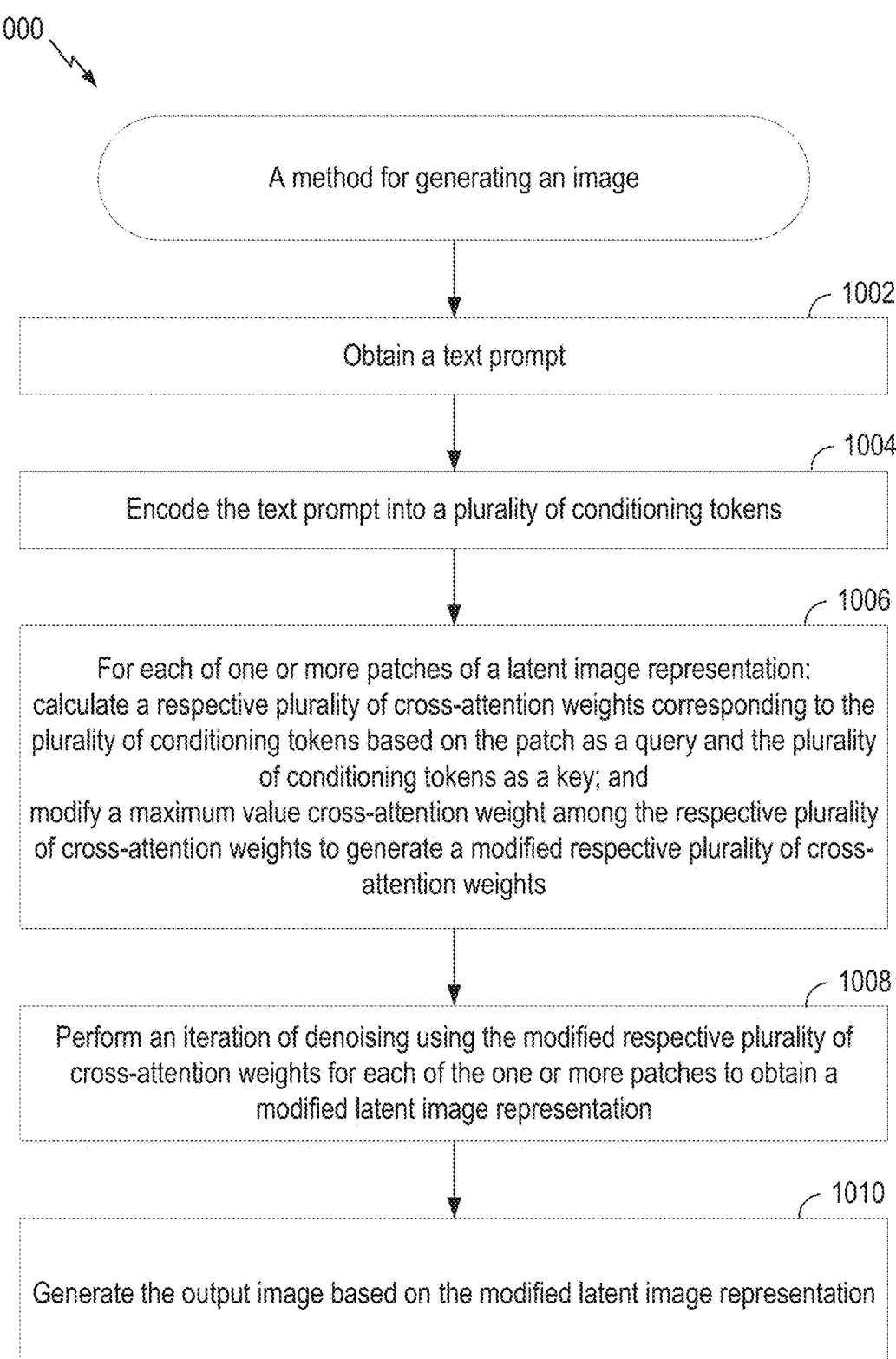

1000

A method for generating an image

1002

Obtain a text prompt

1004

Encode the text prompt into a plurality of conditioning tokens

1006

For each of one or more patches of a latent image representation:
calculate a respective plurality of cross-attention weights corresponding to the plurality of conditioning tokens based on the patch as a query and the plurality of conditioning tokens as a key; and
modify a maximum value cross-attention weight among the respective plurality of cross-attention weights to generate a modified respective plurality of cross-attention weights

1008

Perform an iteration of denoising using the modified respective plurality of cross-attention weights for each of the one or more patches to obtain a modified latent image representation

1010

Generate the output image based on the modified latent image representation

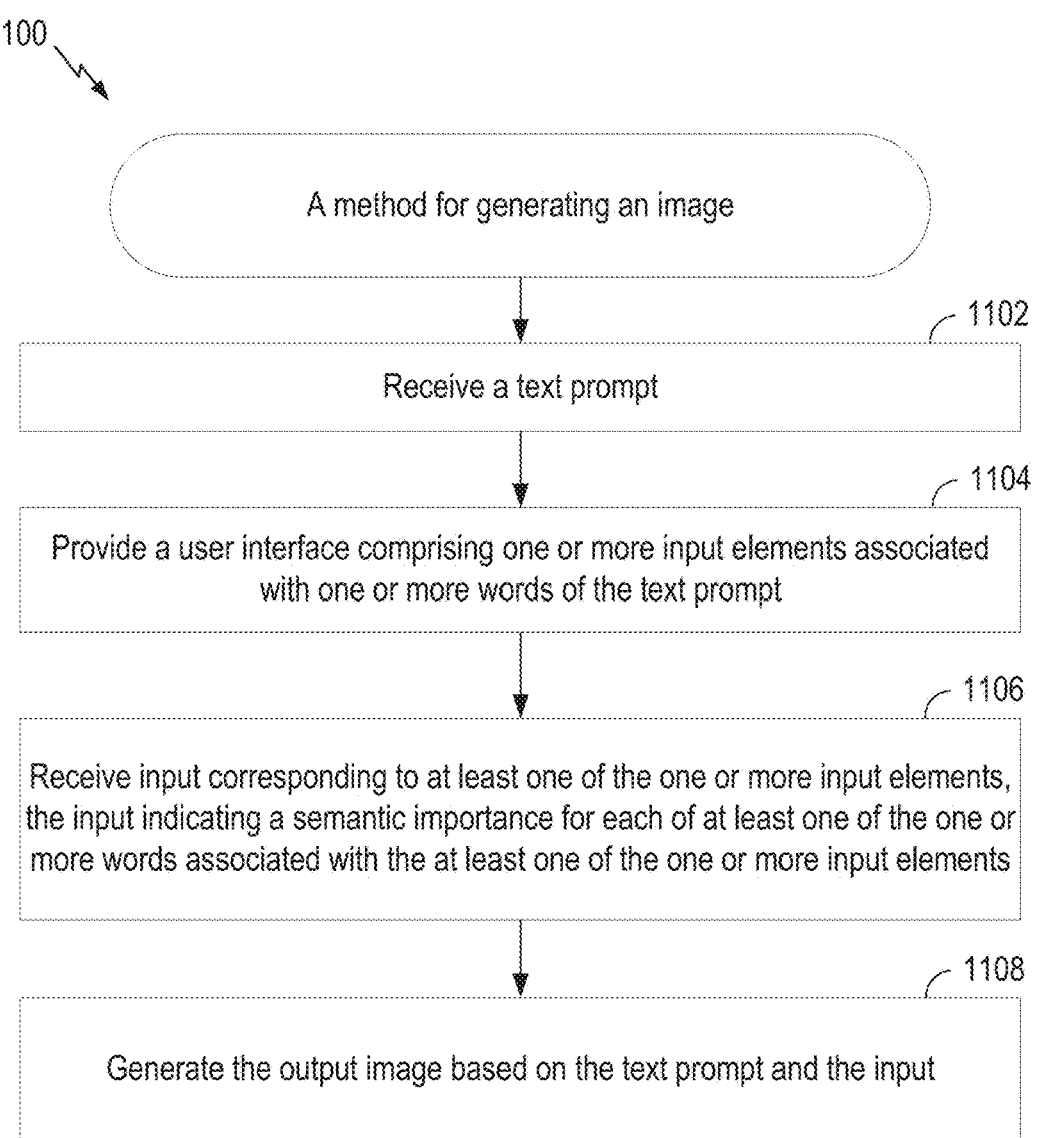

A method for generating an image

1102

Receive a text prompt

1104

Provide a user interface comprising one or more input elements associated with one or more words of the text prompt

1106

Receive input corresponding to at least one of the one or more input elements, the input indicating a semantic importance for each of at least one of the one or more words associated with the at least one of the one or more input elements

1108

Generate the output image based on the text prompt and the input

*FIG. 11*

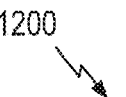

1200

1202

Processing System

1206

1220

Processor(s)

1230

Computer-Readable Medium/Memory

1221

Circuitry for obtaining a text prompt

1231

Code for obtaining a text prompt

1222

Circuitry for encoding the text prompt

1232

Code for encoding the text prompt

1223

Circuitry for calculating and modifying cross-attention weights

1233

Code for calculating and modifying cross-attention weights

1224

Circuitry for performing denoising

1234

Code for performing denoising

1225

Circuitry for generating an output image

1235

Code for generating an output image

*FIG. 12*

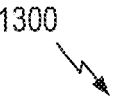
1300
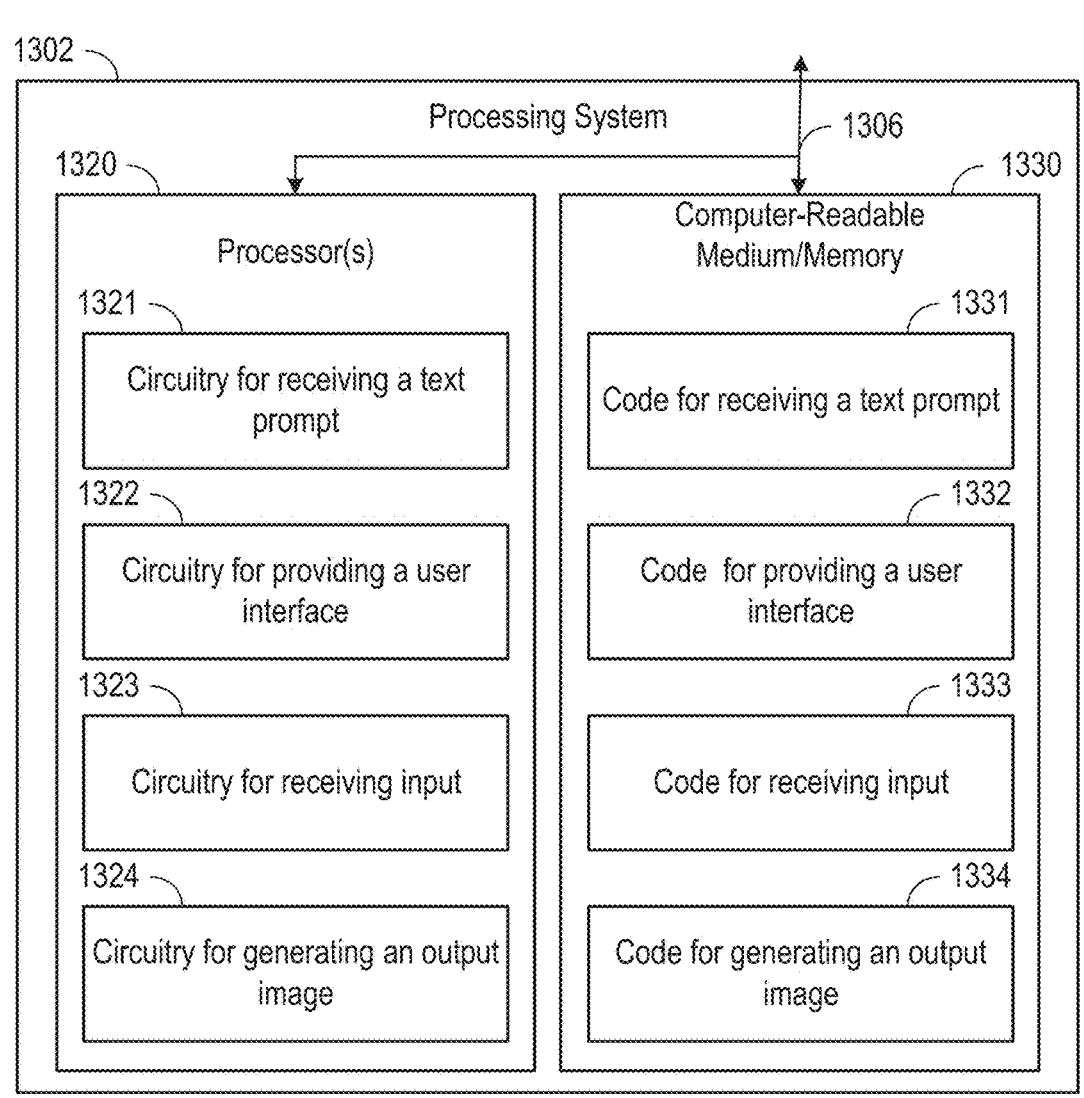
1302
Processing System
1306
1320
Processor(s)
1321
Circuitry for receiving a text prompt
1322
Circuitry for providing a user interface
1323
Circuitry for receiving input
1324
Circuitry for generating an output image
1330
Computer-Readable Medium/Memory
1331
Code for receiving a text prompt
1332
Code for providing a user interface
1333
Code for receiving input
1334
Code for generating an output image
*FIG. 13*

SEGMENTATION FREE GUIDANCE IN DIFFUSION MODELS

FIELD OF THE DISCLOSURE

Aspects of the present disclosure relate to image generation techniques using diffusion models.

DESCRIPTION OF RELATED ART

Diffusion models are a class of generative deep learning models that are capable of generating high fidelity images from text prompts. The underlying principle involves the model adding noise to training data, such as an original image, and learning to recover the data by reversing the noising process. For example, during a training phase, the model may add noise to an image of an apple, and learn to recover the image of an apple from noise (e.g., noisy data that may be generated randomly). Accordingly, the model learns to generate an apple from noise. The model may be trained on many images of many different objects, and accordingly learn to generate many different images of many different objects. During inference, to generate an image from a text prompt, the diffusion model starts with and image of noise (e.g., random data) and can then iteratively denoise the image of noise to eventually generate an output image aligned closer to the text prompt. During the iterative process, the diffusion model generates latent image representations that represent the output image at each stage of the iteration. Although diffusion models can produce a wide variety of images, they sometimes fall short in achieving true fidelity to the given prompt. To address this, various methods, termed guidance or conditioning techniques, have been devised. These strategies enhance image fidelity, as in quality, but may reduce their diversity, as in coverage.

One common guidance method is classifier guidance, where a separate classifier model is trained alongside the diffusion model. The classifier provides gradients and likelihoods that steer the diffusion model to remain consistent and produce images more in line with the textual prompt. However, introducing an additional classifier model adds computational complexity and latency. Thus, classifier-free guidance was introduced to simplify the process by using the diffusion model itself as the classifier. This is performed by running the diffusion model twice-once with the full prompt and once with an empty prompt to generate two conditional scores. The contrasting conditional scores, reflecting residual noise levels from the two iterations, then serve as a guiding signal.

While existing methods produce images adhering to input text prompts, limitations remain in localized fidelity and semantic consistency. The generated images often contain unrelated or contradictory visual features in different spatial regions. This reduces quality and alignment with input textual concepts.

SUMMARY

One aspect provides a method for generating an output image based on a text prompt. The method includes obtaining the text prompt; encoding the text prompt into a plurality of conditioning tokens; for each of one or more patches of a latent image representation: calculating a respective plurality of cross-attention weights corresponding to the plurality of conditioning tokens based on the patch as a query and the plurality of conditioning tokens as a key; and modifying a maximum value cross-attention weight among the respective plurality of cross-attention weights to generate a modified respective plurality of cross-attention weights; performing an iteration of denoising using the modified respective plurality of cross-attention weights for each of the one or more patches to obtain a modified latent image representation; and generating the output image based on the modified latent representation.

Another aspect provides a method for generating an output image based on a text prompt. The method includes receiving the text prompt; providing a user interface comprising one or more input elements associated with one or more words of the text prompt; receiving input corresponding to at least one of the one or more input elements, the input indicating a semantic importance for each of at least one of the one or more words associated with the at least one of the one or more input elements; and generating the output image based on the text prompt and the input.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks. An apparatus may comprise one or more memories; and one or more processors, coupled to the one or more memories, configured to (e.g., cause the apparatus to) perform any portion of any method described herein. In some examples, one or more of the processors may be preconfigured to perform various functions or operations described herein without requiring configuration by software.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 10 depicts an example method for generating an image.

FIG. 11 depicts another example method for generating an image.

FIG. 12 depicts aspects of an example processing system.

FIG. 13 depicts aspects of another example processing system.

DETAILED DESCRIPTION

Figure 1:
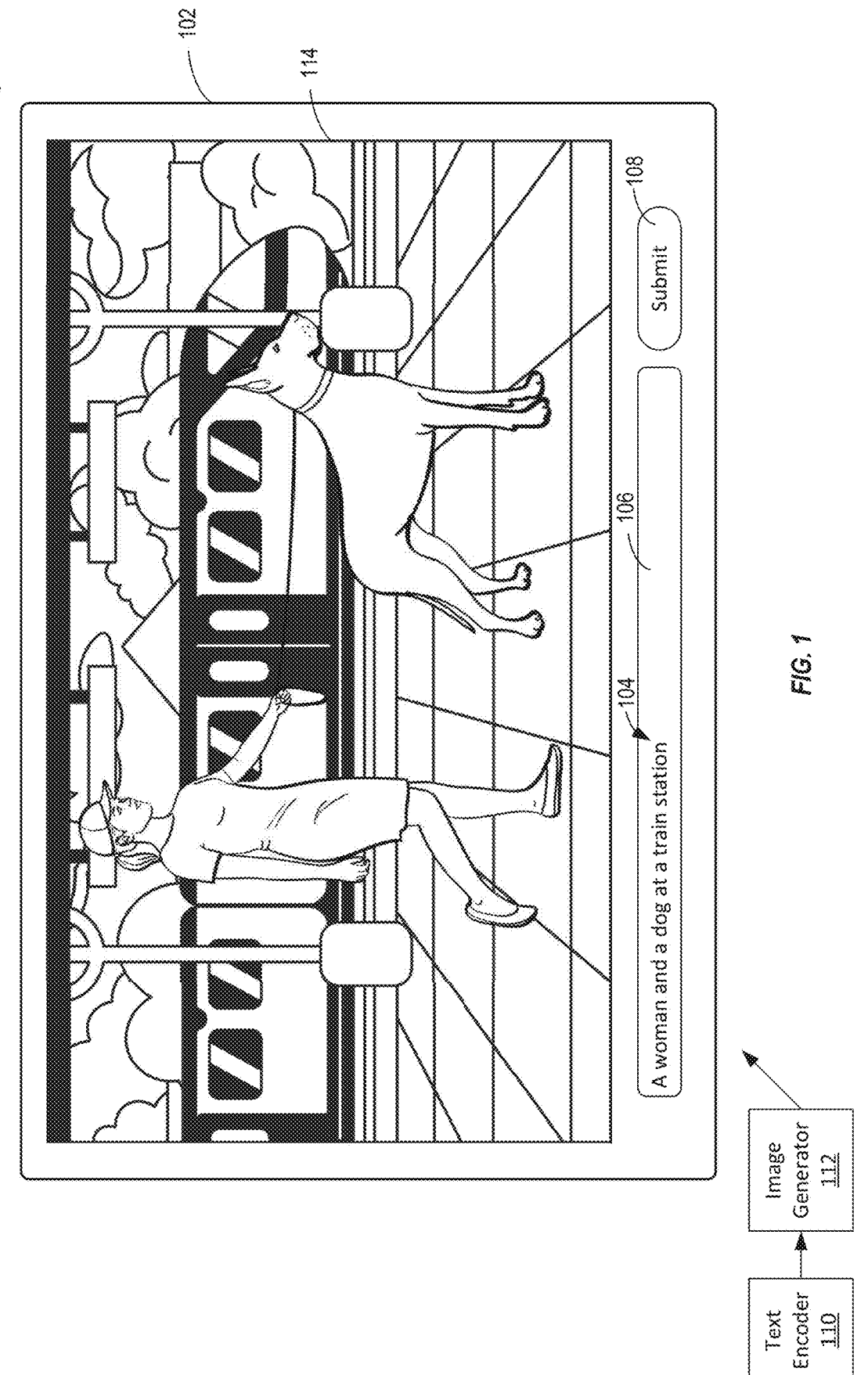
FIG. 1 depicts an example user interface for an image generation system.

Aspects of the present disclosure provide apparatuses, methods, processing systems, and computer-readable mediums for generating visual content from textual descriptions. This process, also referred to herein as "text-to-image transformation," may be used utilized across areas such as content creation, art generation, and beyond. In certain aspects, diffusion models convert textual prompts into realistic visual representations. These models, at their core, simulate a diffusion process, aiming to transition a basic initial distribution (e.g., random noise) into a sophisticated data distribution, typically an image.

The operation of a diffusion model is inherently iterative. The process generally begins with an image loaded with noise, which through successive refinement steps, evolves into a cleaner, more realistic representation. However, to effectively produce images that align with textual prompts, a mechanism may be needed to bridge the gap between text and visual data. For example, cross-attention may be used. Though certain aspects are described with respect to cross-attention, other suitable techniques may be used with certain aspects herein, including the unique user interfaces discussed herein.

In certain aspects, cross-attention, within the context of diffusion models, may be used to generate a measure of relevance between segments of textual prompts and spatial regions, also referred to as patches, of the evolving image, according to certain techniques discussed herein. By gauging this relevance, the diffusion model receives cues on how to refine the image during each iterative step. Instead of a one-sized fits all approach, such cross-attention mechanisms discussed herein assess individual textual keywords and align them with corresponding regions in the image, ensuring more precise representation. The granular attention to specific textual cues, in conjunction with the iterative refinement of the diffusion model, facilitates the generation of images that are not only visually compelling but also contextually aligned with the input text.

However, there are challenges associated with ensuring spatial consistency in the generated images. For instance, an image might display or emphasize unrelated background elements that are not well aligned with the textual intent. Moreover, uniformly applying cross-attention mechanisms to decode relevance between text and image regions can lead to dominant themes potentially overshadowing other details. Such shortcomings underscore the need for a more refined approach that tailors attention to individual image segments, ensuring each section corresponds more faithfully to its related textual cue.

In certain aspects, semantic image generation using localized cross-attention offers solutions to limitations in current diffusion models. By tuning attention weights according to image regions, spatial alignment between visual features and corresponding text improves. This provides a technical advancement over inconsistent semantics due in part to dominant themes overpowering local details. Specifically, attenuating a highest semantic attention weight per patch reduces unrelated or unrealistic combinations within each region. In certain aspects, such an approach does not require a separate segmentation model, but can be implemented using cross-attention for localization.

More generally, certain aspects herein provide techniques for breaking up a text prompt, such as into a plurality of portions or "conditioning tokens" (e.g., each corresponding to one or more words (e.g., a word, phrase, etc.) of the text prompt). For example, a text prompt of a "dog on a couch in an office" may be broken into conditioning tokens of "dog," "couch," and "office," in a simplified example. During one or more iterations of denoising based on the text prompt, the diffusion model may be configured to determine, for one or more patches of a current image representation according to a current iteration, which conditioning token the patch is most associated with (e.g., resembles the most). For example, one patch of the current image may most closely resemble a dog, while another patch may most closely resemble a couch. Techniques herein are configured to steer the diffusion model to then focus the patch on the conditioning token the patch already resembles most, so that during each iteration, the patch continues to be denoised to better resemble the conditioning token the patch resembles most. It should be noted that a given patch may resemble a different conditioning token at different iterations, and be denoised accordingly. Therefore, each patch may be enhanced during each iteration to a different conditioning token, thus improving the overall output image, as patches resembling a couch may better resemble a couch, and patches resembling a dog may better resemble a dog. For example, patches resembling a couch may be less influenced by the conditioning tokens dog and office, while patches resembling a dog may be less influenced by the conditioning tokens couch and office, so that the overall generated image is of higher quality. This provides an improvement over techniques where an entire image may be conditioned more toward a given conditioning token, which may enhance the overall image to better resemble, for example, a dog, but lose fidelity for the couch and office aspects in the image. Rather, the techniques herein can enhance each patch of the image to better resemble the respective object in the patch, such as the dog parts of the image look more dog like, the couch aspects look more couch like, and the office aspects look more office like.

As discussed, certain aspects herein use cross-attention techniques for determining a conditioning token that a given patch resembles most for an iteration, and adjusting cross-attention weight, such as a cross attention weight associated with such conditioning token, to steer the diffusion model to then focus the patch on the conditioning token. In certain aspects, such cross attention weights are calculated anyway as part of operation of the diffusion model, so the techniques herein may add little computational overhead and complexity, thereby providing the technical benefit of computationally efficient image improvement, unlike classifier models which have heavy computational requirement. Accordingly, techniques discussed herein may be implemented even in less computationally complex devices, such as certain mobile or edge devices. The image segmentation into patches that are classified based on conditioning token to guide the diffusion model may be implied, and thus such techniques may be referred to as segmentation-free guidance.

In certain aspects, a graphical user interface (GUI) is provided that enables a user to indicate importance of portion(s) of a text prompt for generating an image, such as for an image overall, or for one or more patches of an image. Such a GUI may be used with the techniques discussed herein with respect to diffusion models and/or cross-attention techniques, or may be used with other image generation techniques, models, etc. For example, a diffusion model may be steered to enhance the image or one or more patches of the image to more resemble indicated more important portion(s) of the text prompt. For example, the user interface may allow a user to provide a relative emphasis strength, also referred to as semantic importance, of one or more words or phrases of the text prompt. An ML model, such as a diffusion model, may be steered to generate an image, or one or more patches of an image, as weighted according to the semantic importance of the one or more words for phrases. For example, a word or phrase may be given two times the relative importance over other words or phrases of the text prompt, such that the image or patch is steered to the word or phrase. In another example, a first word may have a two times importance and a second word a 1.5 times importance as compared to a third word, such that the image or patch is steered most to the first word, more to the second word, and least to the third word. Such techniques provide the technical benefit of user control of image generation, even on screens with limited space, by providing input elements associated with the words or phrases of a text prompt that can be reviewed and manipulated easily. This further allows tailoring images to user creative direction, a technical improvement over fully automated conditioning. Specifically, users can tune guidance weights to align visuals with intentions. Such user emphasis mapping improves creative flexibility and efficiency.

Example Environment and Interface for Performing Image Generation

FIG. 1 illustrates an example user interface 102 for an image generation system 100 in accordance with examples of the present disclosure. In certain aspects, one or more components of the image generation system 100 may be implemented or run on one or more processors, which may be coupled to one or more memories. For example, one or more processors may be configured to perform one or more functions of one or more components of the image generation system 100, such as by executing instructions stored in one or more memories, or without requiring instructions from memory. In certain aspects, the one or more processors may be part of a single apparatus, such as a computing device, a user equipment, a vehicle, etc. In certain aspects, an apparatus may include one or more of the components of the image generation system 100, and/or may be coupled to one or more components of the image generation system 100.

User interface 102 accepts user input in the form of a text prompt 104. The text prompt 104, indicative of a desired image, is entered by a user via a text input field 106. A submission user interface element 108, situated within the user interface 102, initiates the transmission of the text prompt 104 to one or more components of an image generation system for further processing.

In certain aspects, upon submission, text prompt 104 is provided to a text encoder 110. The text encoder 110 is configured to transform the text prompt 104 into an encoded text embedding. In certain aspects, the encoded text embedding captures the semantic nuances inherent to the text prompt 104, allowing for an interpretation of the underlying image description. For example, the text encoder 110 may be similar to a text encoder used with any diffusion model, such as Dall-E 2, Imagen, Stable Diffusion, Midjourney, etc.

The generated encoded text embedding is subsequently provided to an image generator 112. In certain aspects, the image generator 112 generates images in accordance with one or more diffusion processes. For example, the image generator 112 may be similar to an image generator used with any diffusion model, such as Dall-E 2, Imagen, Stable Diffusion, Midjourney, etc. For example, through a series of iterative sampling and denoising stages, applied over a (e.g., pre-determined) number of time steps, the image generator 112 creates an output image 114. The output image 114 resembles text prompt 104 entered into the text input field 106. A user can then introduce a new text prompt 104 into the text input field 106 to generate alternative or additional images.

Figure 2:
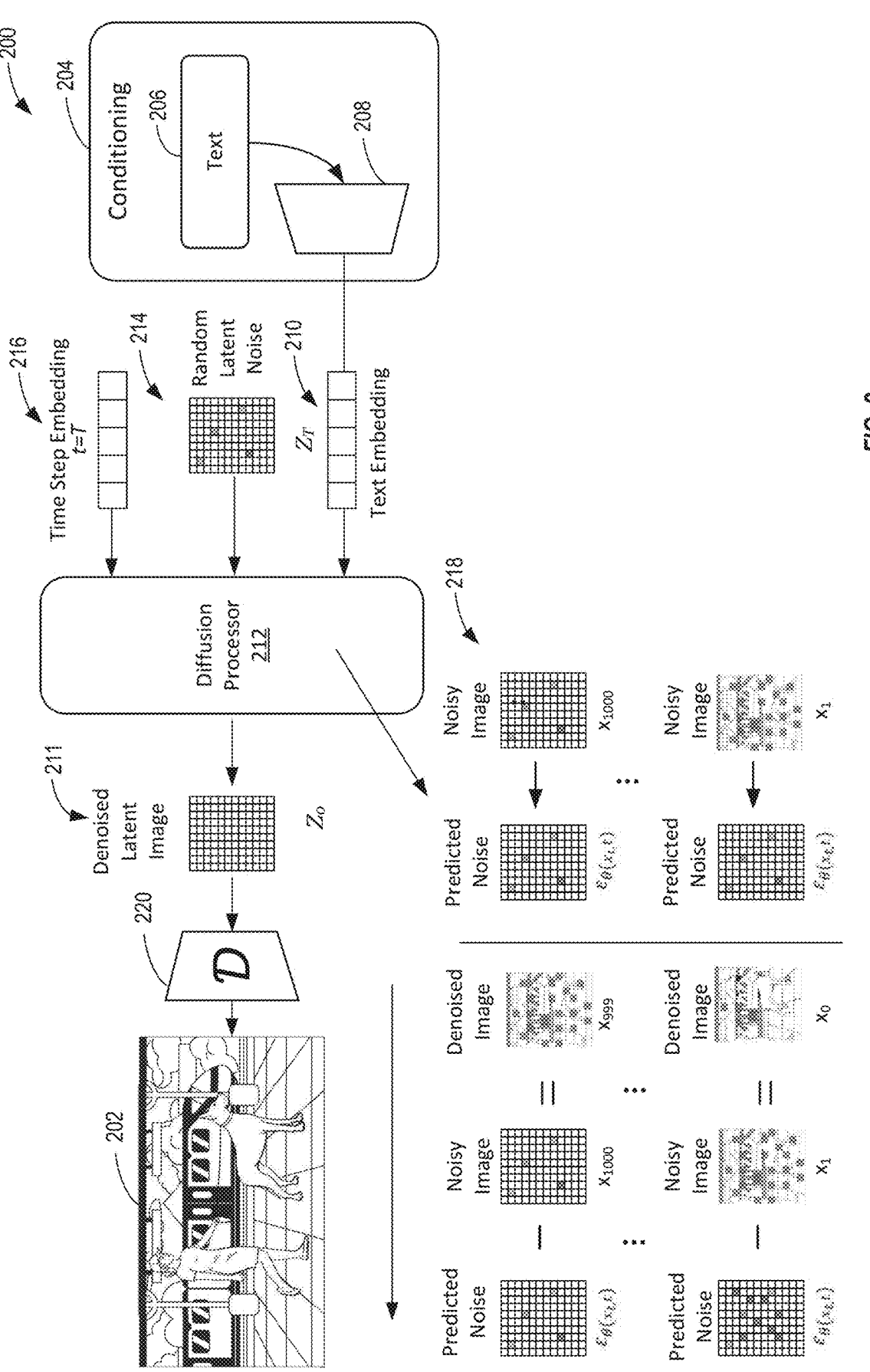
FIG. 2 depicts additional details of an example image generation system that implements diffusion processing in accordance with examples of the present disclosure.

FIG. 2 depicts additional details of an example image generation system 200 that implements diffusion processing in accordance with examples of the present disclosure. In certain aspects, one or more components of the image generation system 200 may be implemented or run on one or more processors, which may be coupled to one or more memories. For example, one or more processors may be configured to perform one or more functions of one or more components of the image generation system 200, such as by executing instructions stored in one or more memories, or without requiring instructions from memory. In certain aspects, the one or more processors may be part of a single apparatus, such as a computing device, a user equipment, a vehicle, etc. In certain aspects, an apparatus may include one or more of the components of the image generation system 200, and/or may be coupled to one or more components of the image generation system 200.

In certain aspects, the example image generation system 200, which may be similar to or the same as image generation system 100, generates an output image 202 based on one or more conditionings 204. The one or more conditionings 204 may include a text prompt 206 that is the same as or similar to the text prompt 104 of FIG. 1. The text prompt 206 can be provided to a text encoder 208 configured to encode the text prompt 206 into a text embedding 210. The text encoder 208 may be the same as or similar to the text encoder 110 of FIG. 1. The text encoder 208 encodes a text prompt 206 into a latent feature representation that captures the semantic meaning of the text. In certain aspects, the text encoder 208 uses a transformer model such as BERT, CLIP, or another language model, to encode the input text prompt 206 into an embedding vector. In certain aspects, the transformer encodes the text into an embedding vector (e.g., text embedding 210) by passing it through multiple self-attention layers. Each self-attention layer transforms the text into a progressively more abstract high-dimensional representation that extracts contextual relationships between the words and concepts in the text prompt 206. The resulting output of the text encoder 208 is a dense latent vector (e.g., text embedding 210) representation of the encoded text prompt 206. This text embedding 210 captures the semantic essence of the text prompt 206 in a format consumable by the image generation system 200.

The text embedding 210 is then provided to a diffusion processor 212. In certain aspects, the diffusion processor 212 comprises an encoder-decoder neural network architecture, where the encoder progressively downsamples a noisy image through a series of layers, while the decoder upsamples a less noisy image to reconstruct the output image in latent space. In certain aspects, at each intermediate layer, cross-attention can be applied to adapt the in-progress image features obtained by the encoder-decoder architecture with the encoded text embedding 210. In certain aspects, cross-attention aligns the text semantics of text embedding 210 with spatial image regions throughout the generation process performed by the diffusion processor 212.

At a first time step (e.g., time step embedding 216), a noisy image (e.g., 214) is provided to the diffusion processor 212. The diffusion processor 212 can estimate, or predict, an amount of noise equal to $\varepsilon_\theta(x_r,t)$ using the encoder-decoder network previously described. A resulting denoised image can be obtained by subtracting or removing the predicted noise $\varepsilon_\theta(x_r,t)$ from the noisy image. For example, as depicted at 218, a noise amount $\varepsilon_\theta(x_r,t)$ can be predicted corresponding to the noisy image $X_{1000}$. A denoised image (e.g., $X_{999}$) is obtained by subtracting, or removing, the predicted noise $\varepsilon_\theta(x_r,t)$ from the noisy image ($X_{1000}$). With each denoising pass, a latent vector representation of the image (e.g., noisy image) becomes less noisy and more refined. After many timesteps, an amount of predicted noise reduces to an acceptable level and results in a denoised image 211 that exists in latent space. The denoised image 211, existing in latent space, is provided to a decoder 220 that then decodes the latent representation of the denoised image 211 into pixel space, resulting in an output image 202 that is based on (e.g., matches) the conditioning text prompt 206.

Figure 3:
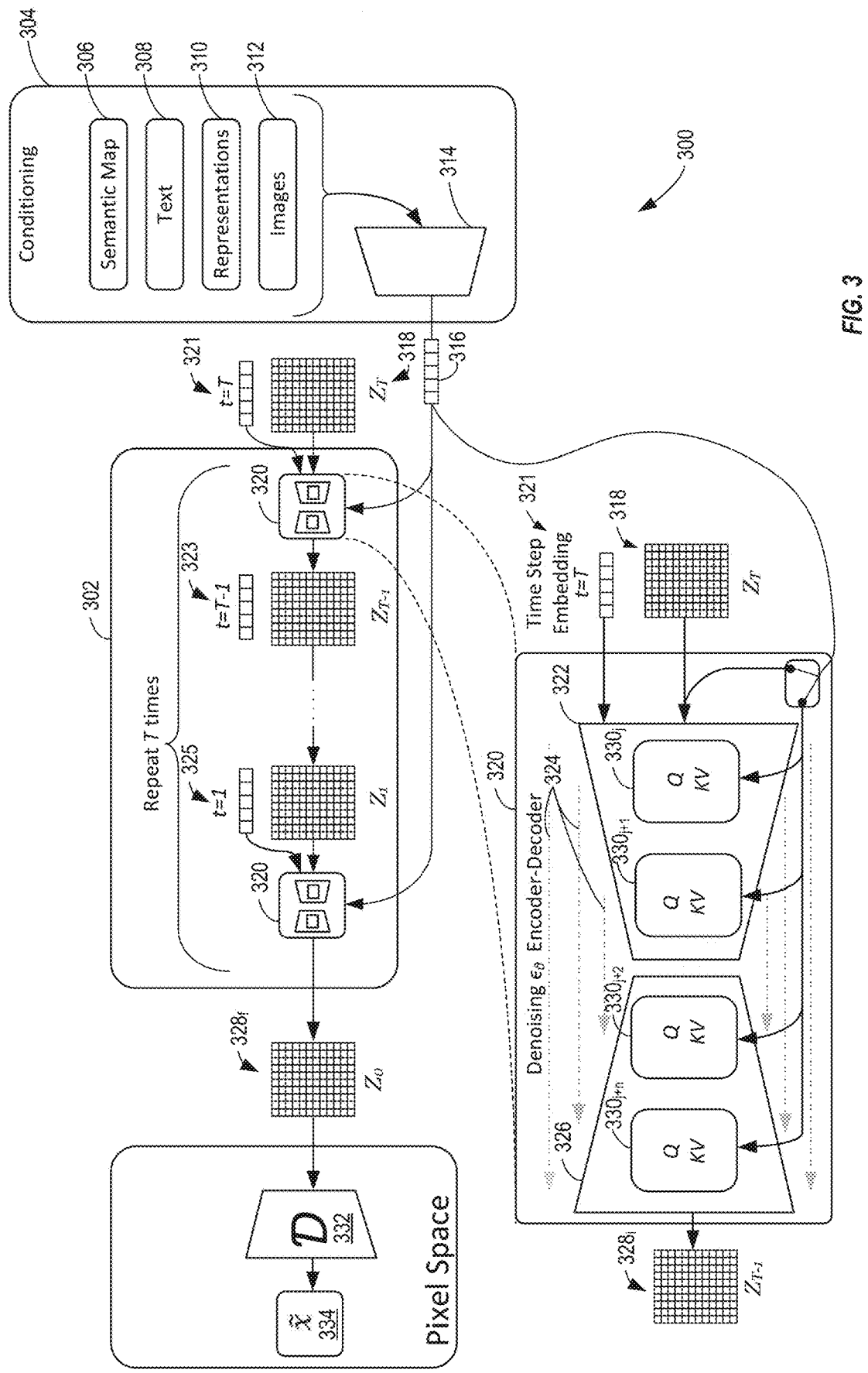
FIG. 3 depicts additional details directed to an implementation of a diffusion processor.

FIG. 3 depicts additional details directed to an implementation of a diffusion processor 302 in accordance with examples of the present disclosure. In certain aspects, one or more components of the diffusion processor 302 may be implemented or run on one or more processors, which may be coupled to one or more memories. For example, one or more processors may be configured to perform one or more functions of one or more components of the diffusion processor 302, such as by executing instructions stored in one or more memories, or without requiring instructions from memory. In certain aspects, the one or more processors may be part of a single apparatus, such as a computing device, a user equipment, a vehicle, etc. In certain aspects, an apparatus may include one or more of the components of the diffusion processor 302, and/or may be coupled to one or more components of the diffusion processor 302.

In certain aspects, the diffusion processor 302 can be the same as or similar to the diffusion processor 212 of FIG. 2. In examples, and similar to FIG. 2, one or more conditioning parameters 304 can be utilized to tailor, refine, or direct an image generation process. For example, conditioning parameters 304 can include semantic map conditioning parameter 306, text conditioning parameter 308, representation conditioning parameter 310, and image conditioning parameter 312. Semantic map conditioning parameter 306 refers to a latent feature map that encodes semantic information about an image; such a conditioning parameter can provide additional guidance about content and style of a desired image beyond a text conditioning parameter 308. Representation conditioning parameter 310 refers to encoded representations of images that capture style, text, composition, etc., which allow a model to replicate elements from a reference image. Image conditioning parameter 312 refers to representations (e.g., in pixel space) of images that capture style, text, composition, etc., which allow a model to replicate elements from a reference image. In addition to the conditions described above, other conditionings that condition or modify a diffusion process are contemplated.

In certain aspects, a text conditioning parameter 308 corresponding to the text prompt 104 of FIG. 1, is provided to the encoder 314. The encoder 314 may be the same as or similar to the text encoder 208 previously described. The encoder 314 generates the text embedding 316, which may be the same as or similar to the text embedding 210 previously described. The text embedding 316 is provided to the diffusion processor 302. In certain aspects, the diffusion processor 302 can refer to a specific implementation of a diffusion model. While FIG. 3 is described with respect to a depicted diffusion model architecture, it should be understand that techniques described herein can be equally applied to other diffusion models and/or architectures.

The diffusion processor 302 utilizes an encoder-decoder framework 320, to estimate the noise level present within the input latent image representation 318. The encoder-decoder framework 320 may include an encoder portion 322 which progressively downsamples a noisy image (e.g. 318) using multiple layers 324, thereby reducing the resolution of the noisy image (e.g., 318). The decoder portion 326 then restores the resolution of the downsampled image to reconstruct the input latent image representation 318 and provide a noise estimation corresponding to a predicted amount of noise within the noisy image (e.g., 318). Subsequently, the encoder-decoder framework 320 can extract (e.g., subtract or remove) the predicted noise from the input latent image representation 318, resulting in an output latent image representation 328 (e.g., output latent image representation $328_i$ which is an output of a given iteration of encoder-decoder framework 320 where there are additional iterations to occur where the output latent image representation $328_i$ from a previous iteration is used as the input representation 318 for a next iteration, or output latent image representation $328_f$ which is an output of a a final iteration of encoder-decoder framework 320). The quantity of noise eliminated can vary, depending on factors like the noise prediction from the encoder-decoder framework 320, specific time embeddings, and/or the mean and deviation of the noise distribution.

In certain aspects, a guidance module $330_j$-$330_{j+n}$ can apply cross-attention to each patch or region of the evolving image. At each intermediate layer, the guidance module $330_j$-$330_{j+n}$ refines the image features derived from the encoder-decoder framework 320 using the encoded text embedding 316. In certain aspects, cross-attention aligns the text semantics of text embedding 316 with spatial image regions throughout the generation process of the encoder-decoder framework 320. That is, at each intermediate layer, a text embedding (e.g., 316) can be mapped to the intermediate layers of the encoder-decoder framework 320 via the one or more cross-attention layers. These cross-attention layers implement cross-attention of Q (query), K (key), and V (value), as learnable projection matrices, where K and V are obtained from the text embedding 316, and Q is obtained from one or more patches of the input (e.g., 318). The cross-attention weights generated by the cross-attention layers indicate how strongly associated each spatial region of the image is with different words or phrases in the prompt (e.g., a specific token in the text embedding 316).

At an initial time step 321, the input latent image representation 318 may be derived from a randomly generated amount of noise. After a number T of iterations (e.g., time steps 321, 323, and 325), an amount of predicted noise may be below a certain threshold such that the diffusion processor 302 outputs a final latent image representation $328_f$. A decoder 332 then decodes the final output latent image representation 328$_f$ to generate the output image 334.

In certain aspects, the diffusion processor 302 may implement a classifier-free guidance approach by executing the encoder-decoder framework 320 twice, once using the text embedding 316 and once with an empty prompt (e.g., empty text embedding). The difference in the noise from the two runs is used as an estimated or predicted noise amount that can be removed. The encoder-decoder framework 320 can then remove this predicted amount of noise from the input latent image representation 318 to obtain an output latent image representation 328 (e.g., 328$_i$ or 328$_f$). Utilizing a classifier-free approach, the text embedding 316 influences a location and an amount of noise that is removed from the input latent image representation 318. In certain aspects, the amount of noise removed is based on the predicted amount of noise determined by the classifier-free approach, a particular time embedding, a mean, and/or deviation of a noise distribution.

In certain aspects, for each patch or region of an in-progress image, the guidance module 330$_j$-330$_{j+n}$ performs a modified cross-attention process by identifying the most relevant text token (conditioning token) from the text embedding 316 that has the highest attention weight for the patch or region. In certain aspects, the guidance module 330$_j$-330$_{j+n}$ then reduces the influence of this weighted text token specifically for that patch, such as by scaling its attention weight (e.g., by a negative factor), setting the attention weight to 0, or otherwise relatively reducing the attention weight with respect to other attention weights. The process of selectively modifying, attenuating, or masking the text token with the most significant attention weight—given by the cross-attention process—for each image patch emphasizes its role when removing noise from the input latent image representation 318. This adjustment to the noise level refines the predicted noise amount, or a related conditioning signal, for each patch, thereby boosting its alignment with local semantics. By modifying or attenuating the dominant semantic concept per patch, the guidance module 330$_j$-330$_{j+n}$ can reduce the interference from text tokens unrelated to the patch content. This emphasizes features related to relevant text cues while ignoring unrelated or unrealistic cue combinations. Though certain aspects are discussed with respect to a classifier-free guidance approach where the difference in the noise from the two runs is used as an estimated or predicted noise amount that can be removed, such that the attention weight of the most relevant text token is reduced in order to emphasize features related to the relevant text token, it should be understood that other types of models may be used where the attention weight of the most relevant text token is increased in order to emphasize features related to the relevant text token. For example, the attention weight of the most relevant text token may be increased in order to emphasize features related to the relevant text token where a single run is used to estimate or predict noise amount.

In a segmentation-free method, the diffusion processor 302 runs the encoder-decoder framework 320 twice: first with the text embedding 316 unmodified without modifying cross-attention weights, and then again with the text embedding 316 unmodified, but with modifying the cross-attention weight, such as modifying (e.g., reducing) the cross-attention weight associated with the text token having the highest cross-attention weight among the text tokens for each patch. The noise variance between these two runs serves as the estimated or predicted amount of noise to be extracted. The encoder-decoder framework 320 can then remove this pre-dicted amount of noise from the input latent image representation 318 to obtain the output latent image representation 328 (e.g., 328$_i$ or 328$_f$). Utilizing a segmentation-free approach, the text embedding 316 influences a location and an amount of noise that is removed from the input latent image representation 318. The amount of noise removed may be based on the predicted amount of noise provided by the classifier-free approach, a particular time embedding, a mean, and/or a deviation of a noise distribution.

Figure 4:
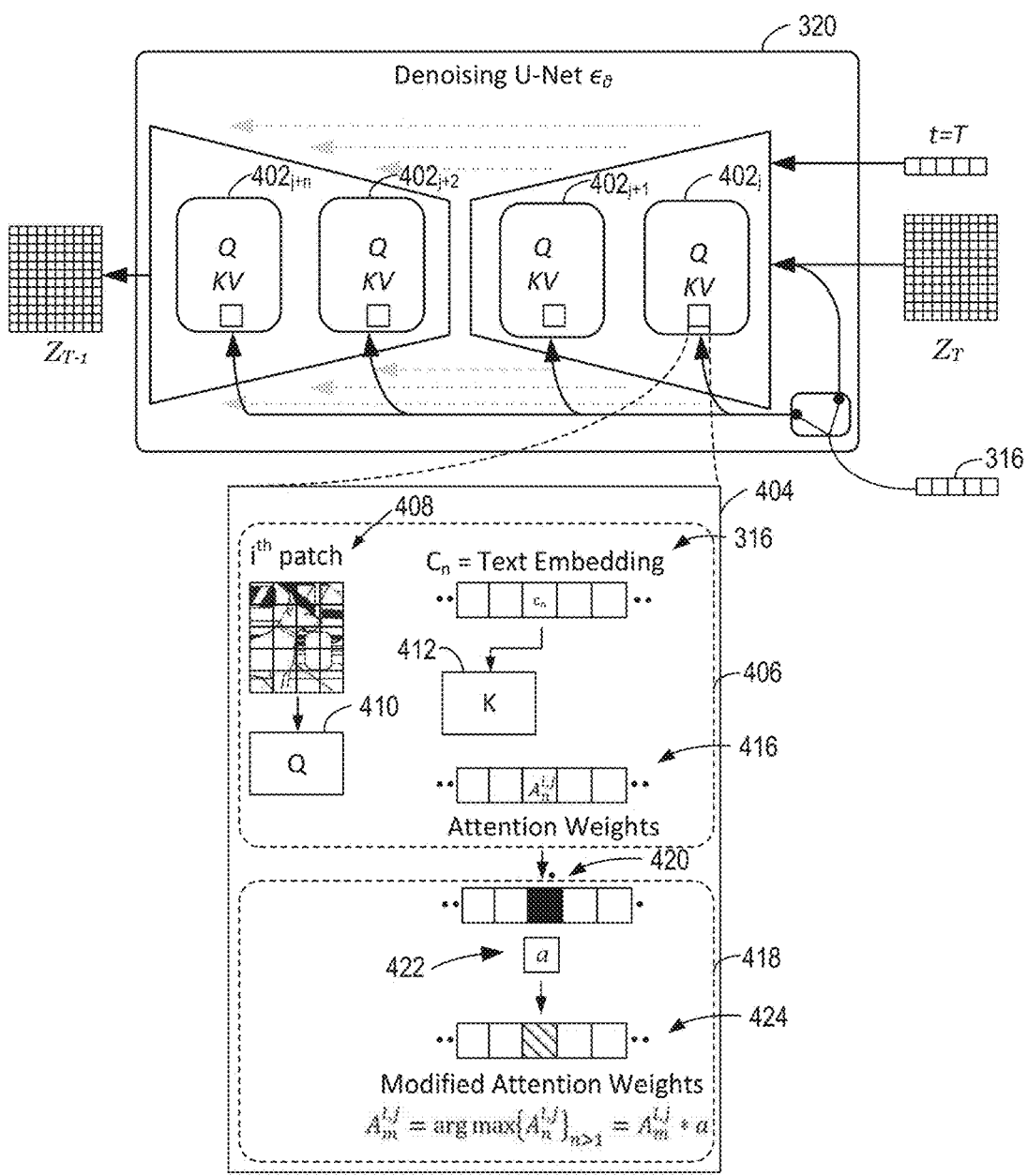
FIG. 4 depicts additional implementation details of one or more guidance modules for generating attention weights.

FIG. 4 depicts additional implementation details of the guidance modules 402$_j$-402$_{j+n}$ according to examples of the present disclosure. The guidance modules 402$_j$-402$_{j+n}$ may be the same as or similar to the guidance modules 330$_j$-330$_{j+n}$ with the addition of an attention weight modifier 404. The guidance modules 402$_j$-402$_{j+n}$ associate text semantics with spatial image regions through cross-attention, including generating cross-attention weights based on key vectors K derived from text tokens and query vectors Q derived from a patch. For each patch 408, cross-attention weight generator 406 computes cross-attention weights 416 between the query 410 derived from patch 408 and corresponding keys 412 derived from the text embedding 316. Each of the cross-attention weights 416 may be associated with a corresponding one of the keys 412, and accordingly a corresponding text token. An attention weight modifier 418 then adjusts the cross-attention weights 416 according to a localized conditioning technique. In certain aspects, the localized conditioning technique can include the attention weight modifier 418 identifying the maximum attention weight 420 among the cross-attention weights 416, the maximum attention weight 420 representing the most relevant semantic concept for that patch 408. The attention weight modifier 418 then modifies (e.g., reduces, such as by scaling) this maximum attention weight 420 by a guidance strength 422 (e.g., a negative scalar) to modify its impact for that patch 408 specifically. In certain aspects, the attention weight modifier 418 scales this maximum attention weight 420 by a negative guidance strength (e.g., '–a') to reduce its impact for that patch 408 specifically. In certain aspects, the negative guidance strength (e.g., 'a') may be set to zero.

As an example, the attention weight modifier 418 may determine that, for an $i^{th}$ patch in the $j^{th}$ cross-attention level/layer, the attention weight $$A_n^{i,j},$$

corresponding to the token $C_n$ in the text embedding 316 (e.g., including text tokens $C_1$-$C_x$) has a highest attention weight. The cross-attention weight, $$A_n^{i,j},$$

is a measure of $i^{th}$ patch's relevance to text token $c_n$, where j indexes the encoding-decoding layers. The attention weight $$A_n^{i,j},$$

is then modified (e.g., reduced, such as multiplied by a scalar 'a') to obtain the modified attention weight attention weight, $$A_m^{i,j},$$

where the other weights in the cross-attention weights 416 may be unmodified. In certain aspects, the resulting scaled weight 424 is provided to an aggregator along with the unmodified cross-attention weights 416. In certain aspects, the scaled weight 424 tailors the semantic blending to emphasize fidelity to the localized inferred semantics within each patch 408 (e.g., image region). In certain aspects, this is achieved without a separate segmentation model utilizing a cross-attention mechanism that includes the attention weight modifier 404.

Figure 5:
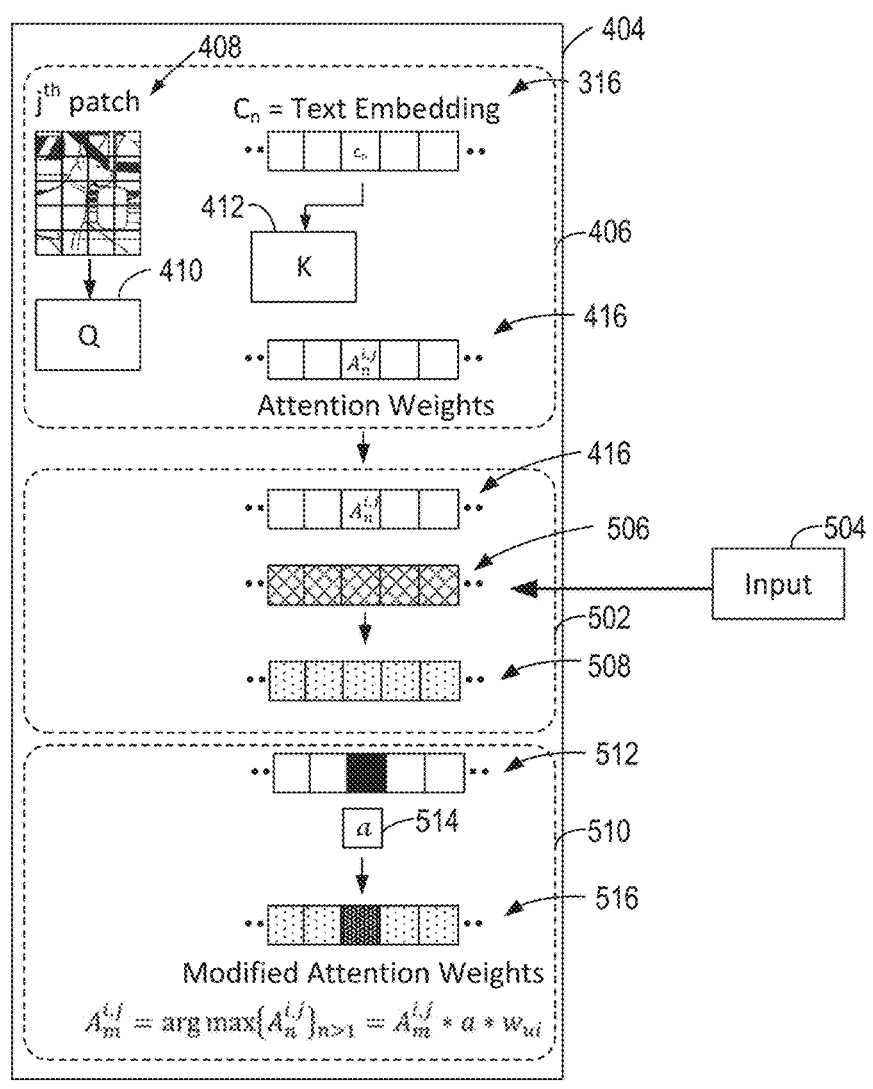
FIG. 5 depicts additional implementation details of one or more guidance modules for generating and modifying attention weights.

FIG. 5 depicts additional implementation details of the guidance modules 402_j-402_{j+n} according to examples of the present disclosure. In certain aspects, the cross-attention weights 416 may be modified by the user selectable weight modifier 502, where the user selectable weight modifier 502 receives, as input 504, user initiated or user designated weightings 506 that are to be applied to the cross-attention weights 416. Accordingly, one or more tokens corresponding to the text embedding 316, may be modified in accordance with the user input 504. The user selectable weight modifier 502 modifies the cross-attention weights 416 by the user initiated or user designated weighting 506 to obtain the cross-attention weights 508. In certain aspects, the attention weight modifier 510 identifies the maximum attention weight 512 of the cross-attention weights 508, and then modifies this maximum attention weight 512, such as by a guidance strength 514, to modify its impact for that patch 408 specifically. Such resulting attention weight may be $$A_m^{i,j} = \arg\ \max\{A_n^{i,j}\}_{n>1} = A_m^{i,j} * a * w_{ui}$$

where other attention weights are equal to $$A_n^{i,j} = A_n^{i,j} * w_{ui}$$

where $w_{ui}$ is a scaling input 504 provided by a user and/or received from a user interface. In certain aspects, the attention weight modifier 510 scales this maximum attention weight 512 by a negative guidance strength (e.g., '-a') to reduce its impact for that patch 408 specifically. In certain aspects, the resulting scaled cross-attention weights 516 are provided to an aggregator along with the unmodified cross-attention weights 416. In certain aspects, the scaled cross-attention weights 516 tailor the semantic blending to emphasize fidelity to the localized inferred semantics within each patch (e.g., image region) in accordance with a user designated or user selectable scaling. In certain aspects, the negative guidance strength (e.g., 'a') may be set to zero.

In an example, equation 1 relates to modifying a noise prediction of a diffusion model to provide guidance to the diffusion model, pushing it towards generating images that are more aligned with a given class. A diffusion model's score (e.g., output), can be provided according to equation 1:

$$\tilde{\varepsilon}_\theta = \varepsilon_\theta(z_\lambda, c) = \omega\sigma_\lambda \nabla_{z_\lambda} \log p_\theta(c \mid z_\lambda) \qquad (1)$$

where $\tilde{\varepsilon}_\theta$ is a modified noise prediction for a given image $z_\lambda$ and class c; $\varepsilon_\theta(z_\lambda, c)$ is a diffusion model's original noise prediction (e.g., output or score) when conditioned on both the image $z_\lambda$ and its class c; $\omega$ is a weight or scaling factor that determines an extent to which the classifier model's gradient influences the final noise prediction; $\sigma_\lambda$ represents the noise level or standard deviation at a specific time step $\lambda$; $\nabla_{z_\lambda}$ is the gradient with respect to the image $z_\lambda$; and log $p_\theta(c \mid z_\lambda)$ represents the confidence of a classifier in predicting the class c for the image $z_\lambda$ (e.g., logarithim of the conditional probability of the class c given image $z_\lambda$ as predicted by a classifier model parameterized by $\theta$).

In an example, the second term of equation 1 for classifier-free guidance may be a scaled difference between conditional and unconditional model scores and can be provided by equation 2:

$$\nabla_{z_\lambda} \log p_\theta(c \mid z_\lambda) = -\frac{1}{\sigma_\lambda}[\varepsilon_\theta(z_\lambda, c) - \varepsilon_\theta(z_\lambda)] \qquad (2)$$

where $\nabla_{z_\lambda}$ is the gradient with respect to the image $z_\lambda$; log $p_\theta(c \mid z_\lambda)$ represents the confidence of a classifier in predicting the class c for the image $z_\lambda$ (logarithim of the conditional probability of the class c given image $z_\lambda$ as predicted by a classifier model parameterized by $\theta$);

$$\frac{1}{\sigma_\lambda}$$

is a scaling factor, such as the noise level or standard deviation at a specific time step $\lambda$; $\varepsilon_\theta(z_\lambda, c)$ is a diffusion model's original noise prediction (e.g., output or score) when conditioned on both the image $z_\lambda$ and its class c; and $\varepsilon_\theta(z_\lambda)$ is the unconditional score for the diffusion model for image $z_\lambda$.

In an example, a "modified" score of a classifier-free diffusion model is related to equation 3:

$$\tilde{\varepsilon}_\theta = (1 - \omega)\varepsilon_\theta(z_\lambda, c) - \omega\varepsilon_\theta(z_\lambda) \qquad (3)$$

where $\tilde{\varepsilon}_\theta$ is a modified noise prediction for a given image $z_\lambda$ and class c which incorporates guidance from a classifier model; $\omega$ is a weight or scaling factor that determines an extent to which the classifier model's gradient influences the final noise prediction; $\varepsilon_\theta(z_\lambda, c)$ is a diffusion model's original noise prediction (output or score) when conditioned on both the image $z_\lambda$ and its class c; and $\varepsilon_\theta(z_\lambda)$ is the unconditional score for the diffusion model for image $z_\lambda$.

In an example, equation 4 relates to the segmentation-free modified score used for denoising:

$$\tilde{\varepsilon}_\theta = \varepsilon_\theta(z_\lambda, c) - \varepsilon_\theta(z_\lambda\{A_n\}_{n\neq m}) \qquad (4)$$

where $\tilde{\varepsilon}_\theta$ is a modified noise prediction for a given image $z_\lambda$ and class c which incorporates guidance from a classifier model; $\varepsilon_\theta(z_\lambda, c)$ is a diffusion model's original noise prediction (output) when conditioned on both the image $z_\lambda$ and its class c; and $\varepsilon_\theta(z_\lambda, \{A_n\}_{n\neq m})$ is computed by running the model on its original prompt, but at an $i^{th}$ cross-attention module and for $j^{th}$ patch, the cross-attention weights $$\{A_n^{i,j}\}$$

are modified according to equation 5:

$$A_m^{i,j} = \arg \max_m \{A_n^{i,j}\}_{n>1} \qquad (5)$$

where the largest attention weight $$A_m^{i,j},$$

(excluding the first key or BoT token) is identified and multiplied by a scalar (e.g., −a) to become $$-a * A_m^{i,j}.$$

In an example, algorithm 1 relates to performing segmentation-free guidance:

| Algorithm 1: Segmentation-free guidance |
| --- |
| 01:     $z_T \sim \mathcal{N}(0, I)$ |
| 02:     for t = T, · · · , 1 do |
| 03:        if t ≥ T − $t_s$ |
|           # compute classifier-free score |
| 04:        $\tilde{\epsilon}(z_t, c) = (1 + \omega)\epsilon(z_t, c) - \omega\epsilon(z_t)$ |
| 05:        else |
| 06:        # compute segmentation-free score |
|           $\tilde{\epsilon}(z_t, c) = (1 + \overline{\omega})\epsilon(z_t, c) - \overline{\omega}\overline{\epsilon}(z_t)$ |
|           # sample $z_{t-1}$ |
| 07:        if t > 1 |
| 08:        $z_{t-1} \sim \mathcal{N}(\mu_\theta(z_t), \Sigma_t)$ |
| 09:        else |
| 10:        $z_0 = z_1 - \sigma_1 \tilde{\epsilon}_1 /\alpha_1$ |
| 11:     return x = $z_0$ | based on a model having noise levels that follow a log-SNR schedule indicated by $\lambda_1$ to $\lambda_T$, such that the noise level starts out low at $\lambda_1$ and the noise level increase towards $\lambda_T$, where $\omega$ is a classifier-free guidance strength (e.g., 7.5), $t_s$ is the number of iterations to use classifier-free guidance before switching to segmentation-free guidance, a is the segmentation free scale (e.g., 10.0), c is the prompt text embedding, such as CLIP text embedding, $\overline{\omega}$ is the segmentation-free guidance strength (e.g., 2.5), $z_T$ is the latent vector sample from a standard normal distribution, t is the diffusion time step, $\tilde{\epsilon}$ is the modified score used for guidance, $\epsilon$ is the original score output by the diffusion model, $z_{t-1}$ is the latent sample at time step t−1, $\mu_\theta(z_t)$ is the mean prediction of the diffusion model, and $\Sigma_t$ is the covariance matrix used to determine noise properties, $z_0$ is final output, $z_1$ is the latent sample at time step t=1, $\sigma_1$ is the noise standard deviation form the scheduler at t=1, $\tilde{\epsilon}_1$ is the modified score at t=1, $\alpha_1$ is the forward process noise standard deviation at t=1, $\epsilon(z_t, c)$ is the original unmodified score output by the diffusion model for the image patch $z_t$, and prompt c, and $\epsilon(z_t)$ and $\overline{\epsilon}(z_t)$ is the score computed by passing $z_t$ through the diffusion model using an empty prompt.

To evaluate images generated in accordance with the proposed segmentation-free guidance techniques, a subset of prompts and corresponding images can be sampled from a validation set, such as the COCO-30K evaluation set. Evaluating all prompts (e.g., 30,000 prompts in the COCO-30K validation set) may require an impractical number of human evaluations. Therefore, the present disclosure provides an evaluation methodology for selecting a representative and fair prompt subset while keeping the number of human evaluations manageable.

Accordingly, the diversity of randomly sampled prompt subsets can first be quantified by computing a Fréchet distance between CLIP text encodings of the prompt subset and CLIP text encodings of the full validation set. The Fréchet distance is a measure used to quantify the similarity between the text encodings of the two sets of prompts. Based on analysis of the Fréchet distance for different sampled subset sizes, a subset size, such as 5,000 prompts, can be used as a subset that provides a sufficiently diverse amount of sampling that approximates the diversity of the full validation set.

Next, classifier-free guidance can be used to generate images for each of the prompts in the sampled subset. The generated images can be ranked based on their CLIP score, which provides an indication of model performance. Prompts can be selected from the 90th percentile, 50th percentile, and 10th percentile of the ranking to represent high, medium and low performing prompts respectively. Selecting prompts across these performance percentiles thereby provides a fair sampling with respect to model capabilities. The selected prompts can be reduced to a final subset of prompts (e.g., 150 prompts) for human evaluation. In accordance with examples disclosed herein, the final subset of prompts can be evaluated by human evaluators, each rating pairs of images (e.g., classifier-free guidance technique generated image and a segmentation-free guidance technique generated image). The human evaluators can select from one of five ratings indicating a preference between the segmentation-free guidance method of the present disclosure and a classifier-free guidance method known in the art. The five ratings can be, for example, much better, slightly better, no preference, slightly worse, and much worse. This subjective human evaluation thereby allows comparison of the two guidance methods with respect to image quality based on a matched text prompt.

Figure 6A:
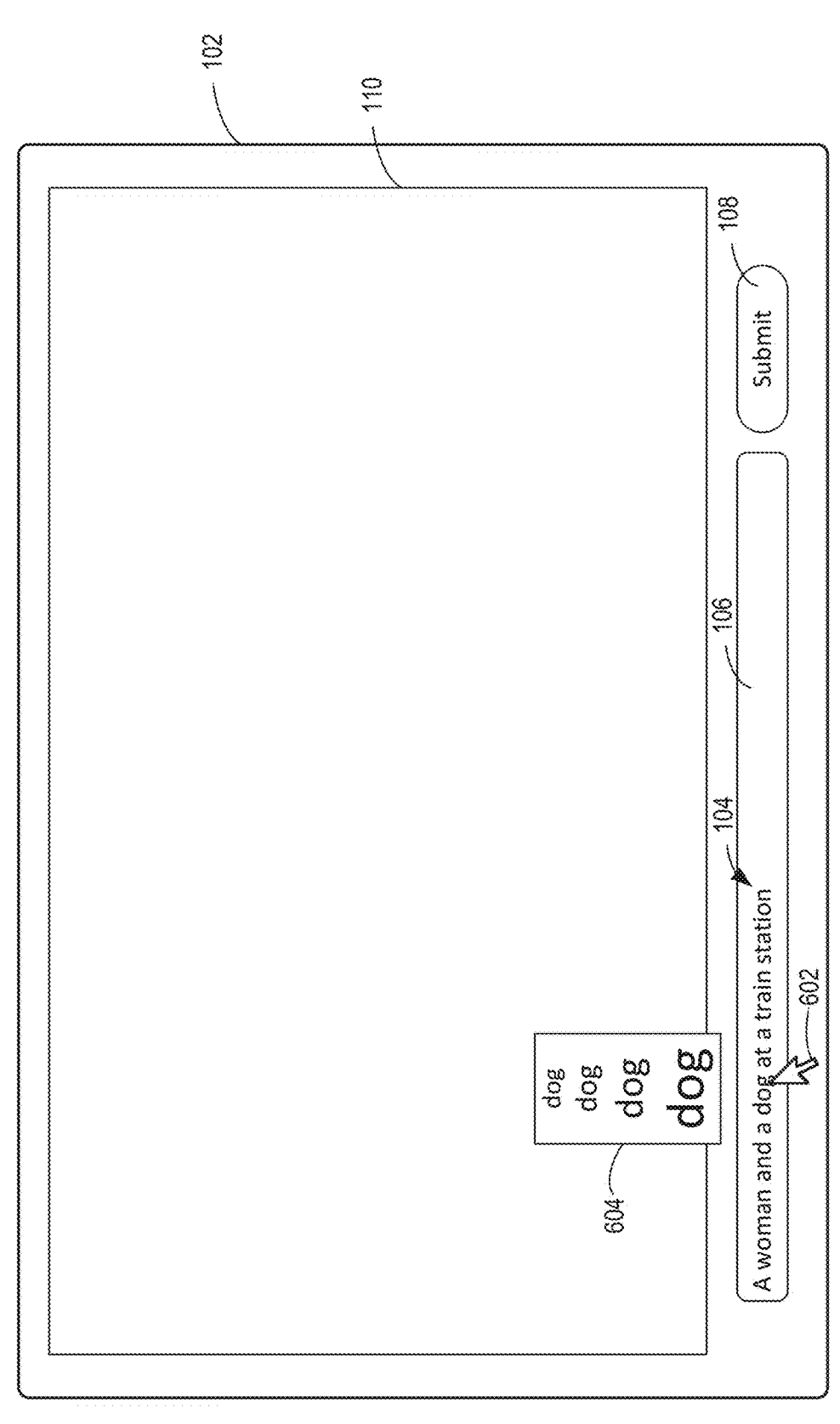
FIGS. 6A-6I depict example user interfaces for receiving user input and displaying a resulting image.

FIG. 6A depicts an example interface 600A permitting users to adjust importance of portion(s) of text prompts. Within this interface, users can choose specific elements like words or phrases from the text prompt 104 shown on user interface 102. To illustrate, the user has chosen the word "dog" from text prompt 104. Following this selection, a context menu 604 pops up on user interface 102. This context menu 604 provides options to change the semantic importance (e.g., corresponding to the weighting or guidance strength) for the selected word or phrase, such as impacting how that concept will be emphasized during the image generation process. It may offer users a straightforward way to make localized improvements and fine-tune aspects of interest. For example, as shown, selection of a larger version of the word or phrase may connote relatively greater semantic importance, and selection of a smaller version of the word or phrase may connote relatively lower semantic importance.

Figure 6B:
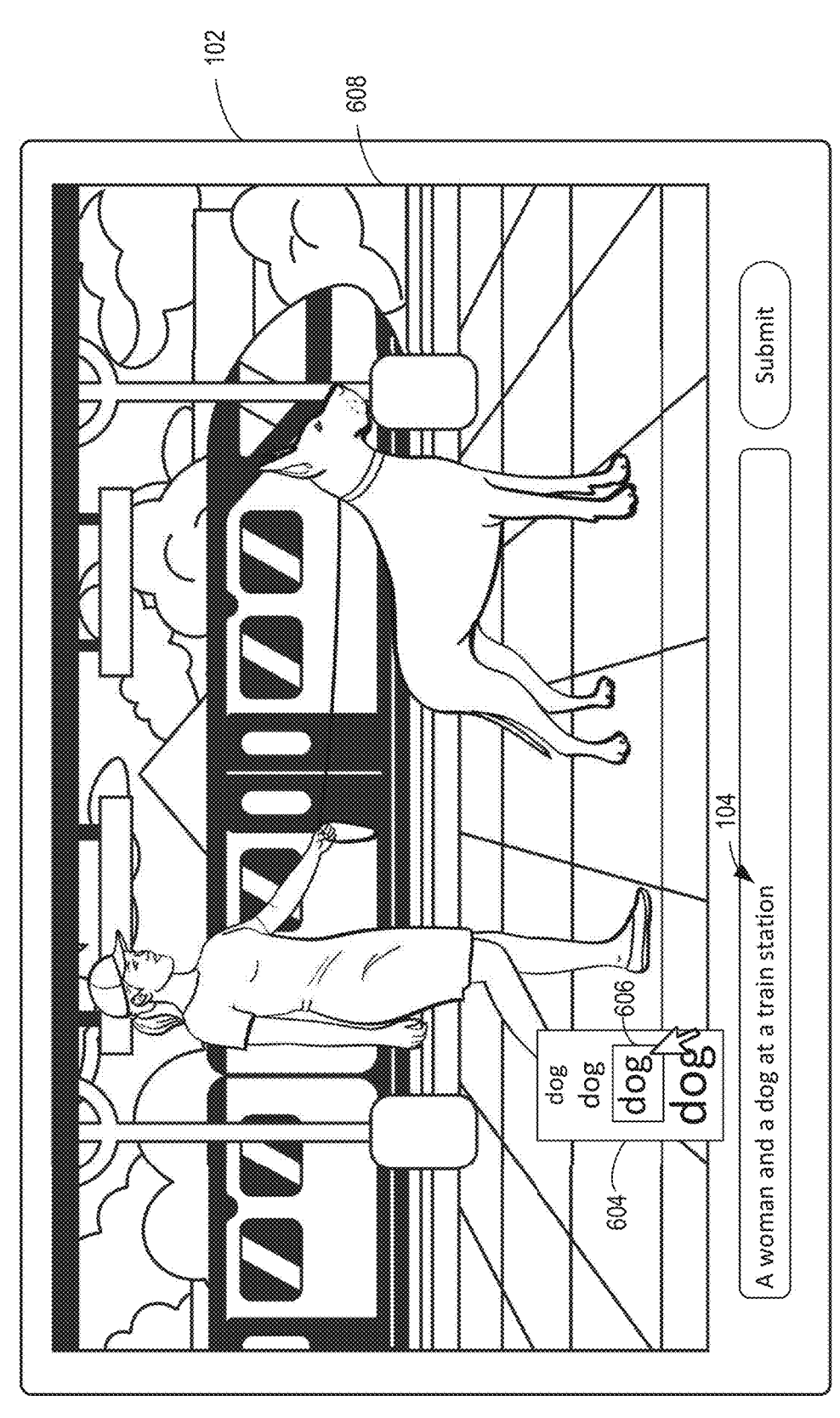

FIG. 6B presents another example interface, 600B, which displays the outcome on user interface 102 after an image 608 is generated. This image 608 reflects the user's chosen element from text prompt 104 (for this example, the word "dog" identified as element 602) applied with their specified semantic importance (denoted as 606). In the context menu 604, users might determine the semantic importance by choosing a representation size for the selected element. Accordingly, the produced image 608 illustrates may show improved or reduced precision in areas connected to the chosen element, such as depicting a more or less detailed dog depending on the semantic importance level selected. In certain aspects, the interface 600B may display a transition from a noisy image to the output image 608, or a transition from an output image associated with a first semantic importance for one or more words to an output image associated with a second semantic importance for one or more words, such as a video transition showing frames transitioning (e.g., morphing) between the output images.

Figure 6C:
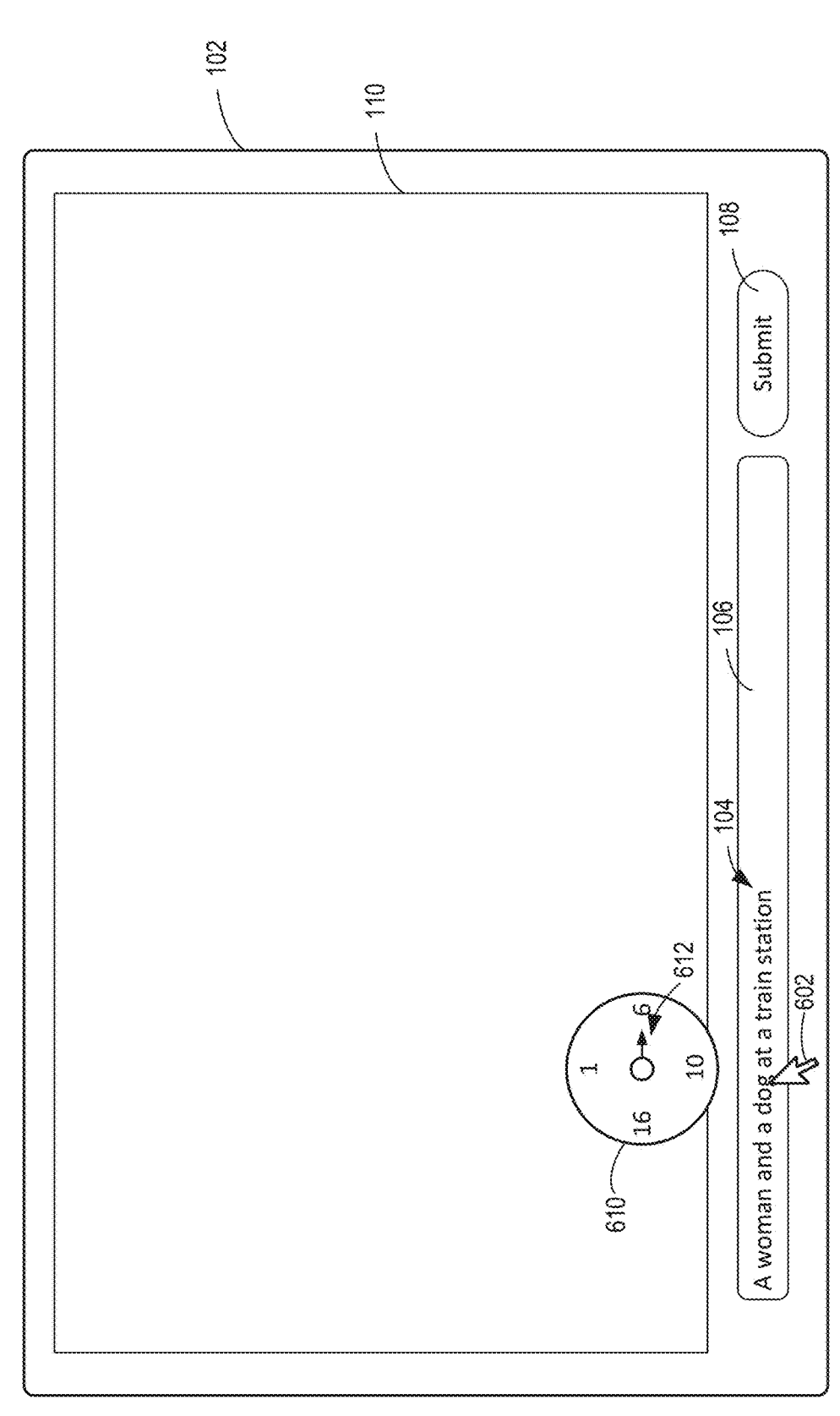
Figure 6D:
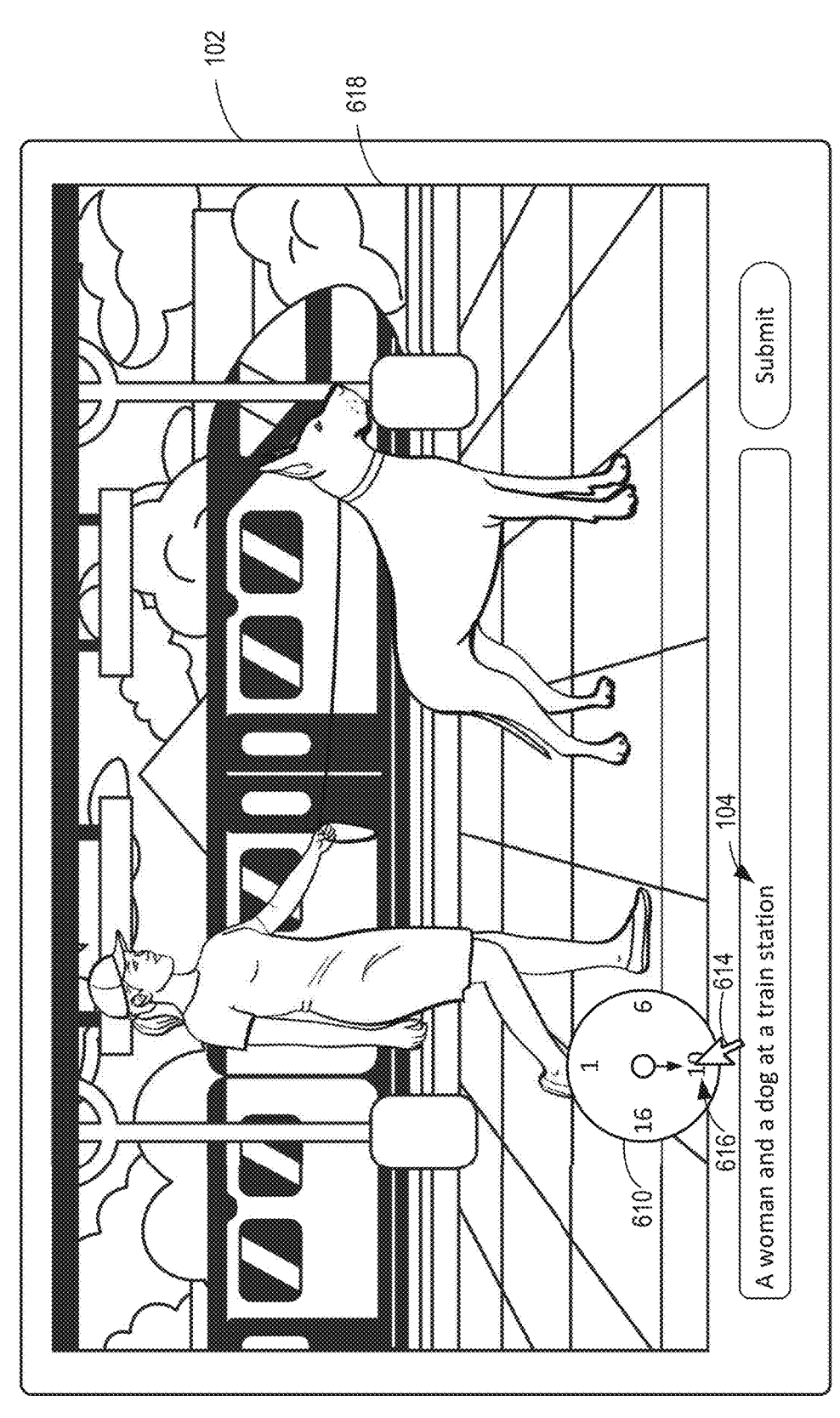

As depicted in FIG. 6C, an alternative interface 600C permits users to precisely adjust semantic importance for individual tokens or elements, such as words or phrases. Within the interface 600C, users have the ability to select an element, like a word or phrase, from the text prompt 104 displayed on user interface 102. For instance, as depicted in interface 600C, a user has chosen the word "dog" from the text prompt 104. Upon this selection, user interface 102 reveals a weighting menu 610. This weighting menu 610 features a dial 612, which users can select or rotate to set the semantic importance (e.g., emphasis weight) for their chosen word or phrase. As depicted in FIG. 6D, the user has set an increased weight, indicated by the value 616 of "10." As a result, interface 600D presents the newly generated image 618, which is influenced by the user-defined weights from menu 610. The final image 618 can exhibit enhanced clarity pertaining to the emphasized concept or element 602, such as depicting a higher-quality dog. In certain aspects, the interface 600D may display a transition from a noisy image to the output image 618, or a transition from an output image associated with a first semantic importance for one or more words to an output image associated with a second semantic importance for one or more words, such as a video transition showing frames transitioning (e.g., morphing) between the output images.

Figure 6E:
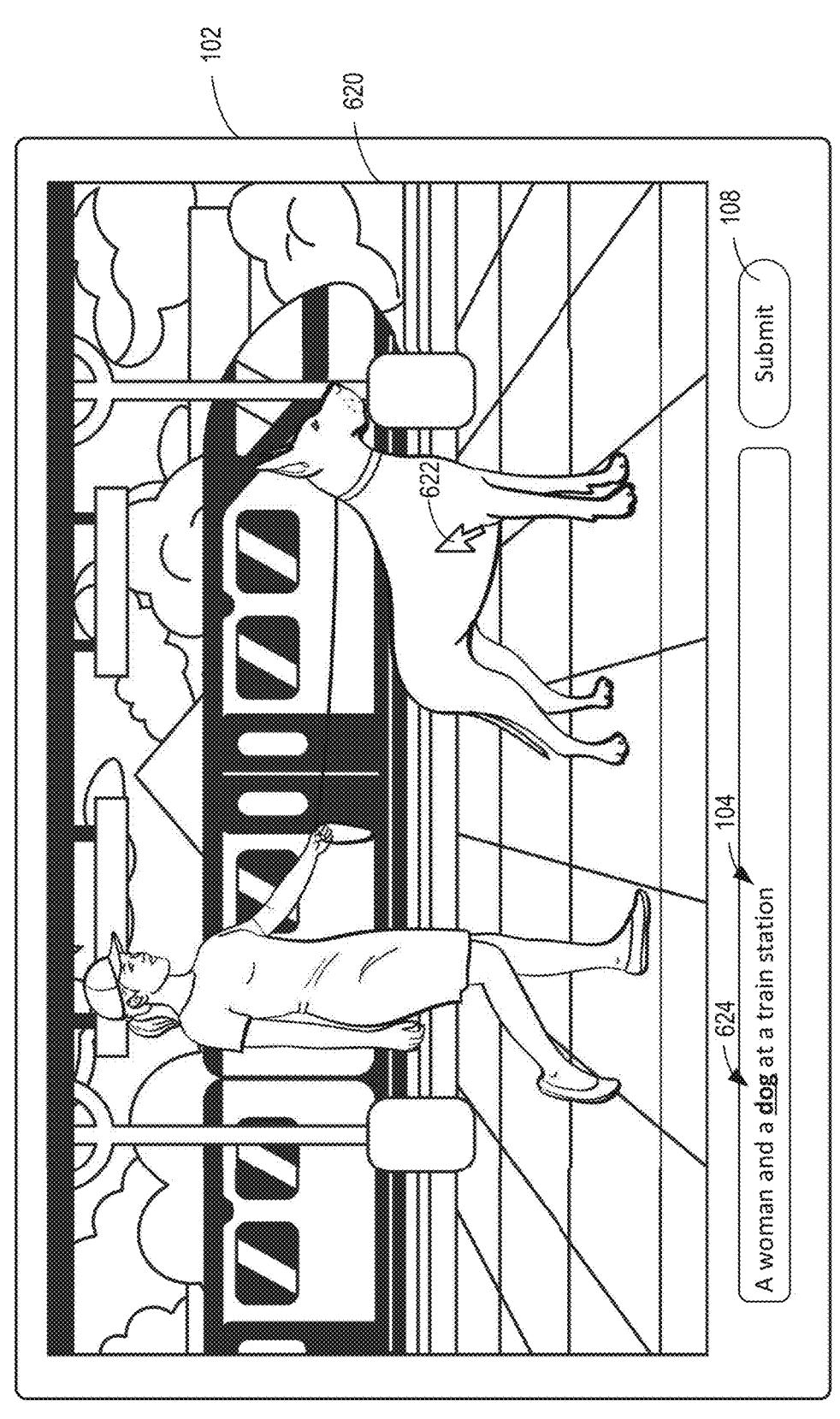
Figure 6F:
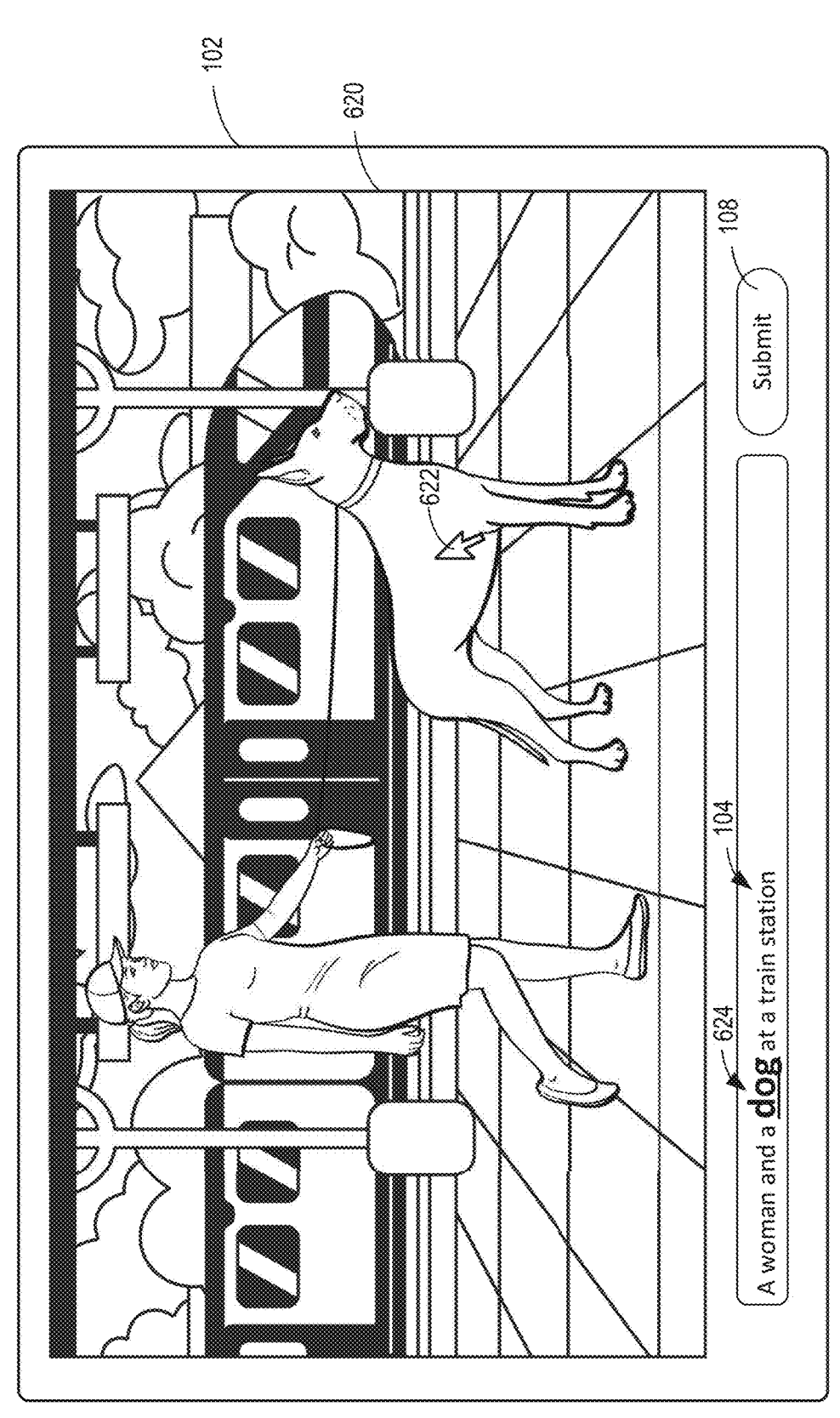

FIG. 6E displays an interface 600E that enables a user to change the text prompt 104 by selecting a concept from image 620 using spatial selections 622. By doing so, a portion of the text prompt 104 related to element 624 can be adjusted, indicating a change in its associated semantic importance. As shown in the interface 600F of FIG. 6F, if a user makes the same spatial selection 622 again, that part of the text prompt 104 linked to element 624 can be adjusted again, indicating a further change in its related semantic importance.

Figure 6G:
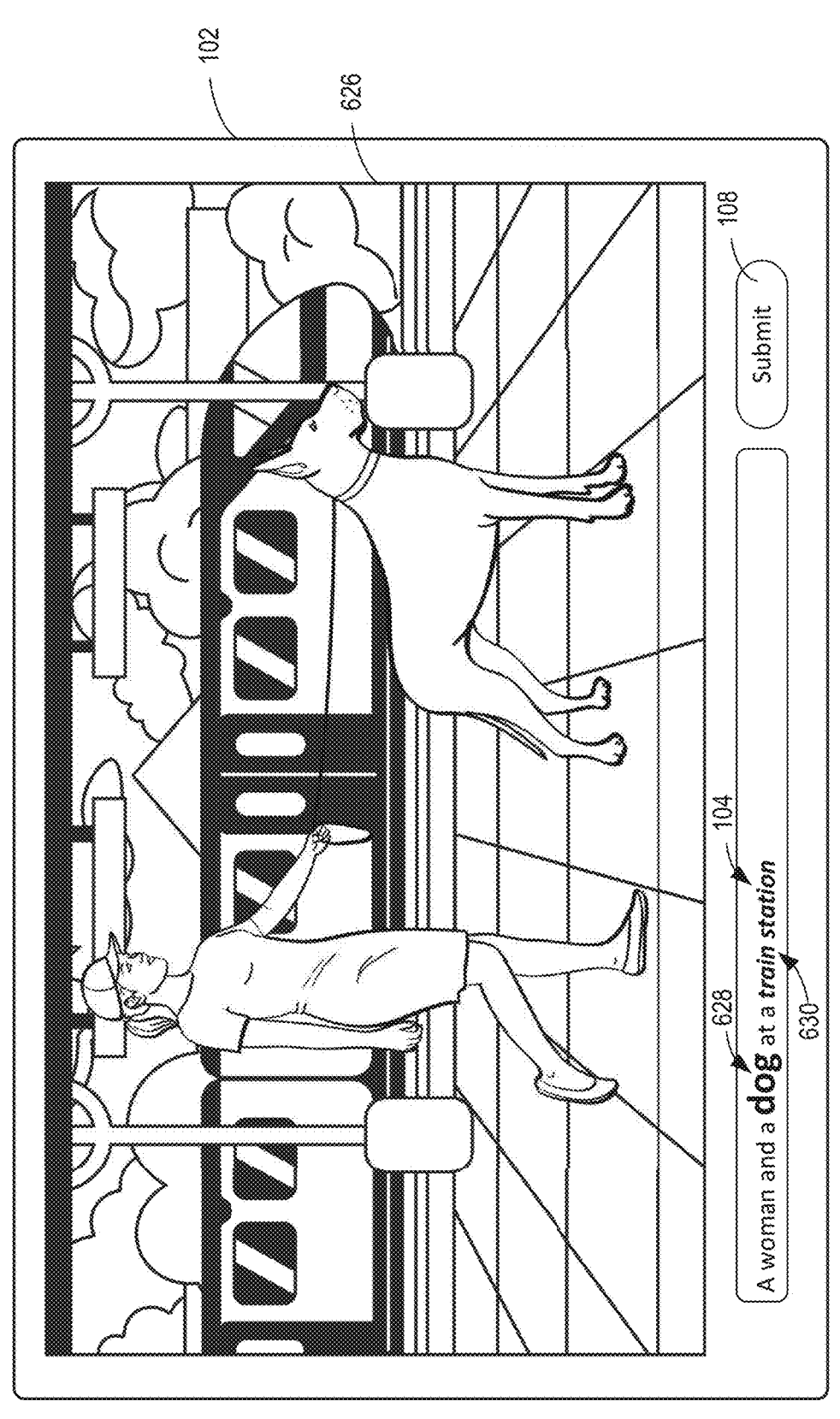

FIG. 6G shows interface 600G, which presents changes to the visual features of text prompt 104 based on semantic importance tailored to specific elements of the prompt. For instance, before or after creating image 626, the visual aspects of elements 628 and 630 are adjusted. Examples of such adjustments can include, but are not limited to bolding, underlining, highlighting, changing a font, etc. These adjustments can arise from user changes or choices made to the semantic importance linked to the text prompt 104's elements. In certain aspects, the interface 600G may display a transition from a noisy image to the output image 626, or a transition from an output image associated with a first semantic importance for one or more words to an output image associated with a second semantic importance for one or more words, such as a video transition showing frames transitioning (e.g., morphing) between the output images.

16

Figure 6H:
Figure 6I:
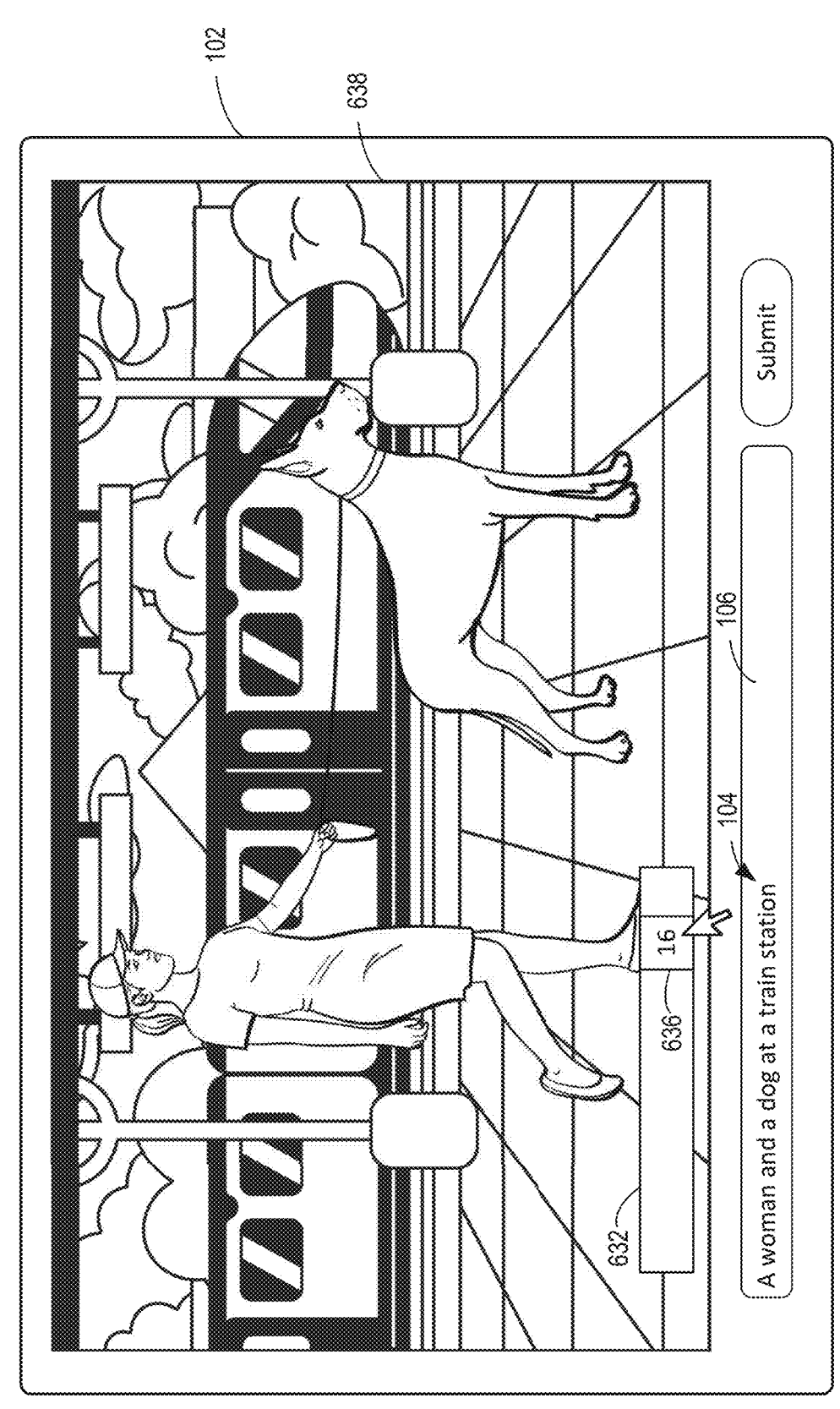

As depicted in FIG. 6H, an alternative interface 600H permits users to precisely adjust semantic importance for individual tokens or elements, such as words or phrases. Within the interface 600H, users have the ability to select an element, like a word or phrase, from the text prompt 104 displayed on user interface 102. For instance, as depicted in interface 600H, a user has chosen the word "dog" from the text prompt 104. Upon this selection, user interface 102 reveals a slider 632. This slider 632 is a graphical control element with which a user may set the semantic importance (e.g., emphasis weight) for their chosen word or phrase by moving an indicator 634. In some cases, a user may also click on a point on the slider to change the setting to set the semantic importance (e.g., emphasis weight) for their chosen word or phrase. As depicted in FIG. 6I, the user has set an increased weight, indicated by the value 636 of "16." As a result, interface 600I presents the newly generated image 638, which is influenced by the user-defined weights from slider 632. The final image 638 can exhibit enhanced clarity pertaining to the emphasized concept or element 602, such as depicting a higher-quality dog. In certain aspects, the interface 600I may display a transition from a noisy image to the output image 638, or a transition from an output image associated with a first semantic importance for one or more words to an output image associated with a second semantic importance for one or more words, such as a video transition showing frames transitioning (e.g., morphing) between the output images.

Figure 7:
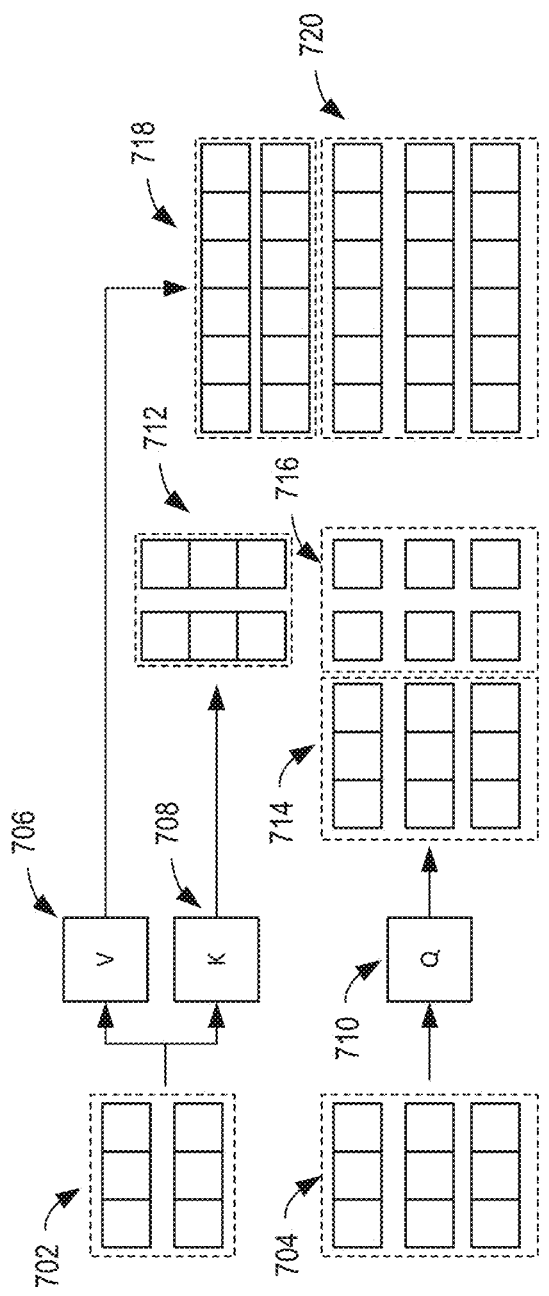
FIG. 7 depicts an example computation flow for generating cross-attention features between two sequences according to examples of the present disclosure.

FIG. 7 illustrates an example computation flow for generating cross-attention features between two data sets, such as sequences 702 and 704, as an example, using the guidance modules 330$_j$-330$_{j+n}$, and/or the guidance modules 402$_j$-402$_{j+n}$. The first sequence 702 represents the text embedding 316 for example. The second sequence 704 represents a patch 408 for example. Cross-attention is applied to the sequences 702, 704 to indicate how strongly associated each spatial region of the image (e.g., patch 408) is with different words in the text prompt (e.g., a specific token in the text embedding 316). As shown, value weights 706 are applied to the first sequence 702 to transform its features to value sequence 718. Key weights 708 are applied to the first sequence 702 to transform its features to key sequence 712. Query weights 710 are applied to the second sequence 704 to obtain query sequence 714. The key sequence 712 and query sequence 714 are compared, for instance using matrix multiplication, to generate an attention matrix 716. In certain aspects, this provides attention scores representing the relevance between specific portions of the two sequences 702, 704. The attention matrix 716 is applied to the value sequence 718 to generate cross-attended feature sequence 720 that represent an aggregation of relevant features from the first sequence 702 based on the second sequence 704. In certain aspects, the attention matrix 716 (or scores) may be modified as described above with respect to FIGS. 3-5.

Certain aspects described herein may be implemented, at least in part, using some form of artificial intelligence (AI), e.g., the process of using a machine learning (ML) model to infer or predict output data based on input data. An example ML model may include a mathematical representation of one or more relationships among various objects to provide an output representing one or more predictions or inferences. Once an ML model has been trained, the ML model may be deployed to process data that may be similar to, or associated with, all or part of the training data and provide an output representing one or more predictions or inferences based on the input data.

ML is often characterized in terms of types of learning that generate specific types of learned models that perform specific types of tasks. For example, different types of machine learning include supervised learning, unsupervised learning, semi-supervised learning, and reinforcement learning.

Supervised learning algorithms generally model relationships and dependencies between input features (e.g., a feature vector) and one or more target outputs. Supervised learning uses labeled training data, which are data including one or more inputs and a desired output. Supervised learning may be used to train models to perform tasks like classification, where the goal is to predict discrete values, or regression, where the goal is to predict continuous values. Some example supervised learning algorithms include nearest neighbor, naive Bayes, decision trees, linear regression, support vector machines (SVMs), and artificial neural networks (ANNs).

Unsupervised learning algorithms work on unlabeled input data and train models that take an input and transform it into an output to solve a practical problem. Examples of unsupervised learning tasks are clustering, where the output of the model may be a cluster identification, dimensionality reduction, where the output of the model is an output feature vector that has fewer features than the input feature vector, and outlier detection, where the output of the model is a value indicating how the input is different from a typical example in the dataset. An example unsupervised learning algorithm is k-Means.

Semi-supervised learning algorithms work on datasets containing both labeled and unlabeled examples, where often the quantity of unlabeled examples is much higher than the number of labeled examples. However, the goal of a semi-supervised learning is that of supervised learning. Often, a semi-supervised model includes a model trained to produce pseudo-labels for unlabeled data that is then combined with the labeled data to train a second classifier that leverages the higher quantity of overall training data to improve task performance.

Reinforcement Learning algorithms use observations gathered by an agent from an interaction with an environment to take actions that may maximize a reward or minimize a risk. Reinforcement learning is a continuous and iterative process in which the agent learns from its experiences with the environment until it explores, for example, a full range of possible states. An example type of reinforcement learning algorithm is an adversarial network. Reinforcement learning may be particularly beneficial when used to improve or attempt to optimize a behavior of a model deployed in a dynamically changing environment, such as a wireless communication network.

ML models may be deployed in one or more devices (e.g., network entities such as base station(s) and/or user equipment(s)) to support various wired and/or wireless communication aspects of a communication system. For example, an ML model may be trained to identify patterns and relationships in data corresponding to a network, a device, an air interface, or the like. An ML model may improve operations relating to one or more aspects, such as transceiver circuitry controls, frequency synchronization, timing synchronization, channel state estimation, channel equalization, channel state feedback, modulation, demodulation, device positioning, transceiver tuning, beamforming, signal coding/decoding, network routing, load balancing, and energy conservation (to name just a few) associated with communications devices, services, and/or networks. AI-enhanced transceiver circuitry controls may include, for example, filter tuning, transmit power controls, gain controls (including automatic gain controls), phase controls, power management, and the like.

Aspects described herein may describe the performance of certain tasks and the technical solution of various technical problems by application of a specific type of ML model, such as an ANN or CNN. It should be understood, however, that other type(s) of ML models may be used in addition to or instead of an ANN or CNN. Hence, unless expressly recited, subject matter regarding an ML model is not necessarily intended to be limited to just an ANN or CNN solution. Further, it should be understood that, unless otherwise specifically stated, terms such "AI model," "ML model," "AI/ML model," "trained ML model," and the like are intended to be interchangeable.

Figure 8:
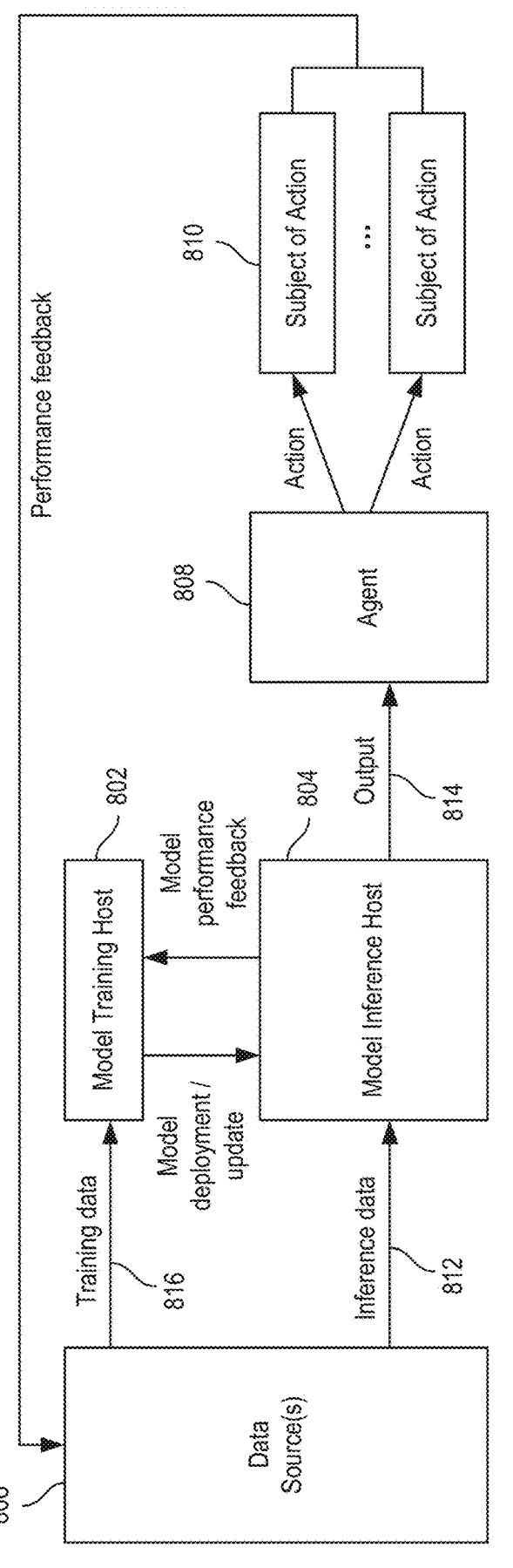
FIG. 8 depicts a diagram illustrating an example AI architecture that may be used for implementing one or more machine learning (ML) models according to examples of the present disclosure.

FIG. 8 is a diagram illustrating an example AI architecture 800 that may be used for implementing one or more ML models. As illustrated, the architecture 800 includes multiple logical entities, such as a model training host 802, a model inference host 804, data source(s) 806, and an agent 808. The AI architecture may be used in any of various use cases for wireless communications, such as those listed above.

The model inference host 804, in the architecture 800, is configured to run an ML model based on inference data 812 provided by data source(s) 806. The model inference host 804 may produce an output 814 (e.g., a prediction or inference, such as a discrete or continuous value) based on the inference data 812, that is then provided as input to the agent 808. The type of agent 808 may be depend on the type of tasks performed by the model inference host 804, the type of inference data 812 provided to model inference host 804, and/or the type of output 814 produced by model inference host 804.

The data sources 806 may be configured for collecting data that is used as training data 816 for training an ML model, or as inference data 812 for feeding an ML model inference operation. In particular, the data sources 806 may collect data from any of various entities (e.g., image data sources, text prompts, etc.), which may include the subject of action 810, and provide the collected data to a model training host 802 for ML model training. In some examples, if the output 814 provided to agent 808 is inaccurate (or the accuracy is below an accuracy threshold), the model training host 802 may determine to modify or retrain the ML model used by model inference host 804, such as via an ML model deployment/update.

In certain aspects, the model training host 802 may be deployed at or with the same or a different entity than that in which the model inference host 804 is deployed. For example, in order to offload model training processing, which can impact the performance of the model inference host 804, the model training host 802 may be deployed at a model server as further described herein. Further, in some cases, training and/or inference may be distributed amongst devices in a decentralized or federated fashion.

Figure 9:
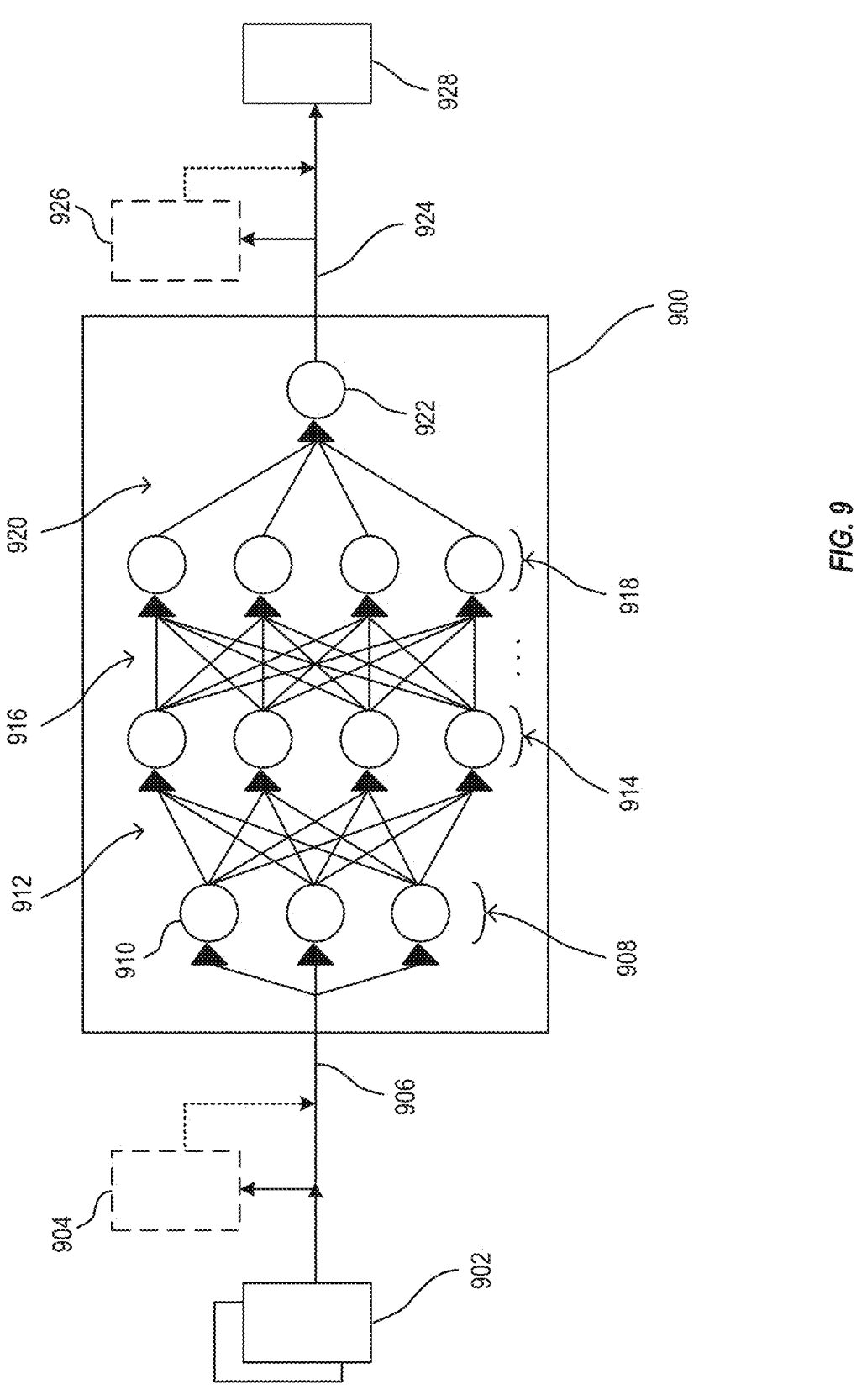
FIG. 9 is an illustrative block diagram of an example artificial neural network (ANN) according to examples of the present disclosure.

FIG. 9 is an illustrative block diagram of an example artificial neural network (ANN) 900.

ANN 900 may receive input data 906 which may include one or more bits of data 902, pre-processed data output from pre-processor 904 (optional), or some combination thereof. Here, data 902 may include training data, verification data, application-related data, or the like, e.g., depending on the stage of development and/or deployment of ANN 900. Pre-processor 904 may be included within ANN 900 in some other implementations. Pre-processor 904 may, for example, process all or a portion of data 902 which may result in some of data 902 being changed, replaced, deleted, etc. In some implementations, pre-processor 904 may add additional data to data 902.

ANN 900 includes at least one first layer 908 of artificial neurons 910 to process input data 906 and provide resulting first layer output data via edges 912 to at least a portion of at least one second layer 914. Second layer 914 processes data received via edges 912 and provides second layer output data via edges 916 to at least a portion of at least one third layer 918. Third layer 918 processes data received via edges 916 and provides third layer output data via edges 920 to at least a portion of a final layer 922 including one or more neurons to provide output data 924. All or part of output data 924 may be further processed in some manner by (optional) post-processor 926. Thus, in certain examples, ANN 900 may provide output data 928 that is based on output data 924, post-processed data output from post-processor 926, or some combination thereof. Post-processor 926 may be included within ANN 900 in some other implementations. Post-processor 926 may, for example, process all or a portion of output data 924 which may result in output data 928 being different, at least in part, to output data 924, e.g., as result of data being changed, replaced, deleted, etc. In some implementations, post-processor 926 may be configured to add additional data to output data 924. In this example, second layer 914 and third layer 918 represent intermediate or hidden layers that may be arranged in a hierarchical or other like structure. Although not explicitly shown, there may be one or more further intermediate layers between the second layer 914 and the third layer 918.

The structure and training of artificial neurons 910 in the various layers may be tailored to specific requirements of an application. Within a given layer of an ANN, some or all of the neurons may be configured to process information provided to the layer and output corresponding transformed information from the layer. For example, transformed information from a layer may represent a weighted sum of the input information associated with or otherwise based on a non-linear activation function or other activation function used to "activate" artificial neurons of a next layer. Artificial neurons in such a layer may be activated by or be responsive to weights and biases that may be adjusted during a training process. Weights of the various artificial neurons may act as parameters to control a strength of connections between layers or artificial neurons, while biases may act as parameters to control a direction of connections between the layers or artificial neurons. An activation function may select or determine whether an artificial neuron transmits its output to the next layer or not in response to its received data. Different activation functions may be used to model different types of non-linear relationships. By introducing non-linearity into an ML model, an activation function allows the ML model to "learn" complex patterns and relationships in the input data. Some non-exhaustive example activation functions include a linear function, binary step function, sigmoid, tanh, ReLU and variants, exponential linear unit (ELU), Swish, Softmax, and others.

Design tools (such as computer applications, programs, etc.) may be used to select appropriate structures for ANN 900 and a number of layers and a number of artificial neurons in each layer, as well as selecting activation functions, a loss function, training processes, etc. Once an initial model has been designed, training of the model may be conducted using training data. Training data may include one or more datasets within which ANN 900 may detect, determine, identify or ascertain patterns. Training data may represent various types of information, including written, visual, audio, environmental context, operational properties, etc. During training, parameters of artificial neurons 910 may be changed, such as to minimize or otherwise reduce a loss function or a cost function. A training process may be repeated multiple times to fine-tune ANN 900 with each iteration.

Various ANN model structures are available for consideration. For example, in a feedforward ANN structure each artificial neuron 910 in a layer receives information from the previous layer and likewise produces information for the next layer. In a convolutional ANN structure, some layers may be organized into filters that extract features from data (e.g., training data and/or input data). In a recurrent ANN structure, some layers may have connections that allow for processing of data across time, such as for processing information having a temporal structure, such as time series data forecasting.

In an autoencoder ANN structure, compact representations of data may be processed and the model trained to predict or potentially reconstruct original data from a reduced set of features. An autoencoder ANN structure may be useful for tasks related to dimensionality reduction and data compression.

A generative adversarial ANN structure may include a generator ANN and a discriminator ANN that are trained to compete with each other. Generative-adversarial networks (GANs) are ANN structures that may be useful for tasks relating to generating synthetic data or improving the performance of other models.

A transformer ANN structure makes use of attention mechanisms that may enable the model to process input sequences in a parallel and efficient manner. An attention mechanism allows the model to focus on different parts of the input sequence at different times. Attention mechanisms may be implemented using a series of layers known as attention layers to compute, calculate, determine or select weighted sums of input features based on a similarity between different elements of the input sequence. A transformer ANN structure may include a series of feedforward ANN layers that may learn non-linear relationships between the input and output sequences. The output of a transformer ANN structure may be obtained by applying a linear transformation to the output of a final attention layer. A transformer ANN structure may be of particular use for tasks that involve sequence modeling, or other like processing.

Another example type of ANN structure, is a model with one or more invertible layers. Models of this type may be inverted or "unwrapped" to reveal the input data that was used to generate the output of a layer.

Other example types of ANN model structures include fully connected neural networks (FCNNs) and long short-term memory (LSTM) networks.

ANN 900 or other ML models may be implemented in various types of processing circuits along with memory and applicable instructions therein, for example, as described herein with respect to FIGS. 2-9. For example, general-purpose hardware circuits, such as, such as one or more central processing units (CPUs) and one or more graphics processing units (GPUs) may be employed to implement a model. One or more ML accelerators, such as tensor processing units (TPUs), embedded neural processing units (eNPUs), or other special-purpose processors, and/or field-programmable gate arrays (FPGAs), application-specific integrated circuits (ASICs), or the like also may be employed. Various programming tools are available for developing ANN models.

There are a variety of model training techniques and processes that may be used prior to, or at some point following, deployment of an ML model, such as ANN 900 of FIG. 9.

As part of a model development process, information in the form of applicable training data may be gathered or otherwise created for use in training an ML model accordingly. Once an ML model has been trained with training data, its performance may be evaluated. In some scenarios, evaluation/verification tests may use a validation dataset, which may include data not in the training data, to compare the model's performance to baseline or other benchmark information. If model performance is deemed unsatisfactory, it may be beneficial to fine-tune the model, e.g., by changing its architecture, re-training it on the data, or using different optimization techniques, etc. Once a model's performance is deemed satisfactory, the model may be deployed accordingly. In certain instances, a model may be updated in some manner, e.g., all or part of the model may be changed or replaced, or undergo further training, just to name a few examples.

As part of a training process for an ANN, such as ANN 900 of FIG. 9, parameters affecting the functioning of the artificial neurons and layers may be adjusted. For example, backpropagation techniques may be used to train the ANN by iteratively adjusting weights and/or biases of certain artificial neurons associated with errors between a predicted output of the model and a desired output that may be known or otherwise deemed acceptable. Backpropagation may include a forward pass, a loss function, a backward pass, and a parameter update that may be performed in training iteration. The process may be repeated for a certain number of iterations for each set of training data until the weights of the artificial neurons/layers are adequately tuned.

Backpropagation techniques associated with a loss function may measure how well a model is able to predict a desired output for a given input. An optimization algorithm may be used during a training process to adjust weights and/or biases to reduce or minimize the loss function which should improve the performance of the model. There are a variety of optimization algorithms that may be used along with backpropagation techniques or other training techniques. Some initial examples include a gradient descent based optimization algorithm and a stochastic gradient descent based optimization algorithm. A stochastic gradient descent (or ascent) technique may be used to adjust weights/biases in order to minimize or otherwise reduce a loss function. A mini-batch gradient descent technique, which is a variant of gradient descent, may involve updating weights/biases using a small batch of training data rather than the entire dataset. A momentum technique may accelerate an optimization process by adding a momentum term to update or otherwise affect certain weights/biases.

An adaptive learning rate technique may adjust a learning rate of an optimization algorithm associated with one or more characteristics of the training data. A batch normalization technique may be used to normalize inputs to a model in order to stabilize a training process and potentially improve the performance of the model.

A "dropout" technique may be used to randomly drop out some of the artificial neurons from a model during a training process, e.g., in order to reduce overfitting and potentially improve the generalization of the model.

An "early stopping" technique may be used to stop an on-going training process early, such as when a performance of the model using a validation dataset starts to degrade.

Another example technique includes data augmentation to generate additional training data by applying transformations to all or part of the training information.

A transfer learning technique may be used which involves using a pre-trained model as a starting point for training a new model, which may be useful when training data is limited or when there are multiple tasks that are related to each other.

A multi-task learning technique may be used which involves training a model to perform multiple tasks simultaneously to potentially improve the performance of the model on one or more of the tasks. Hyperparameters or the like may be input and applied during a training process in certain instances.

Another example technique that may be useful with regard to an ML model is some form of a "pruning" technique. A pruning technique, which may be performed during a training process or after a model has been trained, involves the removal of unnecessary (e.g., because they have no impact on the output) or less necessary (e.g., because they have negligible impact on the output), or possibly redundant features from a model. In certain instances, a pruning technique may reduce the complexity of a model or improve efficiency of a model without undermining the intended performance of the model.

Pruning techniques may be particularly useful in the context of wireless communication, where the available resources (such as power and bandwidth) may be limited. Some example pruning techniques include a weight pruning technique, a neuron pruning technique, a layer pruning technique, a structural pruning technique, and a dynamic pruning technique. Pruning techniques may, for example, reduce the amount of data corresponding to a model that may need to be transmitted or stored.

Weight pruning techniques may involve removing some of the weights from a model. Neuron pruning techniques may involve removing some neurons from a model. Layer pruning techniques may involve removing some layers from a model. Structural pruning techniques may involve removing some connections between neurons in a model. Dynamic pruning techniques may involve adapting a pruning strategy of a model associated with one or more characteristics of the data or the environment. For example, in certain wireless communication devices, a dynamic pruning technique may more aggressively prune a model for use in a low-power or low-bandwidth environment, and less aggressively prune the model for use in a high-power or high-bandwidth environment. In certain aspects, pruning techniques also may be applied to training data, e.g., to remove outliers, etc. In some implementations, pre-processing techniques directed to all or part of a training dataset may improve model performance or promote faster convergence of a model. For example, training data may be pre-processed to change or remove unnecessary data, extraneous data, incorrect data, or otherwise identifiable data. Such pre-processed training data may, for example, lead to a reduction in potential overfitting, or otherwise improve the performance of the trained model.

One or more of the example training techniques presented above may be employed as part of a training process. As above, some example training processes that may be used to train an ML model include supervised learning, unsupervised learning, semi-supervised learning, and reinforcement learning technique.

Decentralized, distributed, or shared learning, such as federated learning, may enable training on data distributed across multiple devices or organizations, without the need to centralize data or the training. Federated learning may be particularly useful in scenarios where data is sensitive or subject to privacy constraints, or where it is impractical, inefficient, or expensive to centralize data. In the context of wireless communication, for example, federated learning may be used to improve performance by allowing an ML model to be trained on data collected from a wide range of devices and environments. For example, an ML model may be trained on data collected from a large number of wireless devices in a network, such as distributed wireless communication nodes, smartphones, or internet-of-things (IoT) devices, to improve the network's performance and efficiency. With federated learning, a device may receive a copy of all or part of a model and perform local training on such copy of all or part of the model using locally available training data. Such a device may provide update information (e.g., trainable parameter gradients) regarding the locally trained model to one or more other devices (such as a network entity or a server) where the updates from other-like devices may be aggregated and used to provide an update to a shared model or the like. A federated learning process may be repeated iteratively until all or part of a model obtains a satisfactory level of performance. Federated learning may enable devices to protect the privacy and security of local data, while supporting collaboration regarding training and updating of all or part of a shared model.

FIG. 10 depicts an example method 1000 of generating an output image based on a text prompt. In one aspect, method 1000 can be implemented by any of the image generation systems described herein, such as with respect to FIGS. 1-6G.

Method 1000 starts at block 1002 with obtaining a text prompt.

The method 1000 continues to block 1004 with encoding the text prompt into a plurality of conditioning tokens.

The method 1000 continues to block 1006 and performs the following for each of one or more patches of the latent image representation: calculating a respective plurality of cross-attention weights corresponding to the plurality of conditioning tokens based on the patch as a query and the plurality of conditioning tokens as a key; and modifying a maximum value cross-attention weight among the respective plurality of cross-attention weights to generate a modified respective plurality of cross-attention weights. In certain aspects, to modify the maximum value cross-attention weight among the respective plurality of cross-attention weights comprises to reduce the maximum value cross-attention weight. In certain aspects, to modify the maximum value cross-attention weight among the respective plurality of cross-attention weights comprises to multiply the maximum value cross-attention weight by a negative scalar value. In certain aspects, the negative scalar value is received as a user-specified parameter. In certain aspects, to modify the maximum value cross-attention weight among the respective plurality of cross-attention weights comprises to set the maximum value cross-attention weight to zero. In certain aspects, to perform the iteration of denoising, comprises: generating a first output based on the latent image representation and the respective plurality of cross-attention weights for each of the one or more patches of the latent image representation; generating a second output based on the latent image representation and the modified respective plurality of cross-attention weights for each of the one or more patches of the latent image representation; and subtracting the second output from the first output to obtain the modified latent image representation. In certain aspects, to perform the iteration of denoising, comprises: generating the modified latent image representation based on the latent image representation and the modified respective plurality of cross-attention weights for each of the one or more patches of the latent image representation.

The method 1000 continues to block 1008 with performing an iteration of denoising using the modified respective plurality of cross-attention weights for each of the one or more patches to obtain a modified latent image representation.

The method 1000 continues to block 1010 with generating the output image based on the modified latent representation. In certain aspects, the output image is displayed via a display.

In certain aspects, the method 1000 can include performing one or more initial denoising iterations using classifier-free guidance prior to performing the iteration of denoising using the modified respective plurality of cross-attention weights for each of the one or more patches.

In certain aspects, the method 1000 can include displaying a user interface configured to receive input indicative of an emphasis strength associated with one or more words of the text prompt, wherein the emphasis strength controls an amount to modify the maximum value cross-attention weight among the respective plurality of cross-attention weights. In certain aspects, the user interface includes one or more interface elements configured to receive the input, the one or more interface elements including at least one of a slider, a numerical input, or a keyword highlight.

In certain aspects, the method 1000 can include for each of one or more patches of the modified latent image representation: calculating a respective second plurality of cross-attention weights corresponding to the plurality of conditioning tokens based on the patch as another query and the plurality of conditioning tokens as another key; and modifying another maximum value cross-attention weight among the respective second plurality of cross-attention weights to generate another modified respective plurality of second cross-attention weights; and performing a second iteration of denoising using the modified respective plurality of second cross-attention weights for each of the one or more patches of the modified latent image representation to obtain a second modified latent image representation, wherein to generate the output image based on the modified latent representation comprises to decode the second modified latent image representation using a decoder to generate the output image.

In certain aspects, the method 1000 can include modulating one or more carrier wave signals with data indicative of the output image. In certain aspects, one or more antennas are configured to transmit the one or more carrier wave signals to a device.

Note that FIG. 10 is just one example of a method, and other methods including fewer, additional, or alternative steps are possible consistent with this disclosure.

FIG. 11 depicts an example method 1100 of generating an output image based on a text prompt. In one aspect, method 1100 can be implemented by any of the image generation systems described herein, such as with respect to FIGS. 1-6G.

Method 1100 starts at block 1102 with receiving a text prompt.

The method 1100 continues to block 1104 with providing a user interface comprising one or more input elements associated with one or more words of the text prompt.

The method 1100 continues to block 1106 with receiving input corresponding to at least one of the one or more input elements, the input indicating a semantic importance for each of at least one of the one or more words associated with the at least one of the one or more input elements. In certain aspects, a first input element of the one or more input elements is a slider element configured to increase or decrease the importance of a first word of the one or more words. In certain aspects, a first input element of the one or more input elements is a dial element configured to increase or decrease the importance of a first word of the one or more words.

The method 1100 continues to block 1108 with generating the output image based on the text prompt and the input. In certain aspects, to generate the output image, comprises generating the output image using the text prompt and the input as inputs to a generative artificial intelligence (AI) model. In certain aspects, the output image emphasizes one or more objects associated with the at least one of the one or more words indicated as having higher semantic importance as compared to other words of the one or more words.

In certain aspects, the method 1100 includes displaying the user interface at the display and displaying the output image at the display.

In certain aspects, the method 1100 includes modifying an appearance of the at least one of the one or more words based on the indicated semantic importance. In certain aspects, to modify the appearance of the at least one of the one or more words comprises highlighting the at least one of the one or more words.

In certain aspects, the method 1100 includes prior to receiving the input, displaying a first image associated with the text prompt; and after receiving the input, displaying the output image. In certain aspects, the method 1100 includes displaying a transition from the first image to the output image. In certain aspects, the output image emphasizes one or more objects associated with the at least one of the one or more words as compared to the one or more objects in the first image. In certain aspects, the method includes generating the first image using the text prompt as input to a generative artificial intelligence (AI) model, where to generate the output image comprises generating the output image using the text prompt and the input as inputs to the generative AI model.

In some aspects, the method 1100 includes encoding the text prompt into a plurality of conditioning tokens; for each of one or more patches of a latent image representation: calculating a respective plurality of cross-attention weights corresponding to the plurality of conditioning tokens based on the patch as a query and the plurality of conditioning tokens as a key; and modifying a maximum value cross-attention weight among the respective plurality of cross-attention weights to generate a modified respective plurality of cross-attention weights; and performing an iteration of denoising using the modified respective plurality of cross-attention weights for each of the one or more patches to generate the output image. In certain aspects, at least one cross-attention weight among the respective plurality of cross-attention weights is modified based on the indicated semantic importance.

Note that FIG. 11 is just one example of a method, and other methods including fewer, additional, or alternative steps are possible consistent with this disclosure.

Example Processing System for Generating an Output Image

FIG. 12 depicts aspects of an example processing system 1200.

The processing system 1200 includes a processing system 1202 includes one or more processors 1220. The one or more processors 1220 are coupled to a computer-readable medium/memory 1230 via a bus 1206. In certain aspects, the computer-readable medium/memory 1230 is configured to store instructions (e.g., computer-executable code) that when executed by the one or more processors 1220, cause the one or more processors 1220 to perform the method 1000 described with respect to FIG. 10, or any aspect related to it, including any additional steps or sub-steps described in relation to FIG. 10. The processing system 1200 may further include one or more of a display (e.g., configured to display a user interface), a modem (e.g., configured to modulate data, such as image data, on a carrier wave), and one or more antennas (e.g., configured to transmit and/or receive data, such as in conjunction with the modem.

In the depicted example, computer-readable medium/memory 1230 stores code (e.g., executable instructions) for obtaining a text prompt 1231, code for encoding the text prompt 1232, code for calculating and modifying cross-attention weights 1233, code for performing denoising 1234, and code for generating an output image 1235. Processing of the code 1231-1235 may enable and cause the processing system 1200 to perform the method 1000 described with respect to FIG. 10, or any aspect related to it.

The one or more processors 1220 include circuitry configured to implement (e.g., execute) the code stored in the computer-readable medium/memory 1230, including circuitry for obtaining a text prompt 1221, circuitry for encoding the text prompt 1222, circuitry for calculating and modifying cross-attention weights 1223, circuitry for performing denoising 1224, and circuitry for generating an output image 1225. Processing with circuitry 1221-1225 may enable and cause the processing system 1200 to perform the method 1000 described with respect to FIG. 10, or any aspect related to it.

Example Processing System for Generating an Output Image

FIG. 13 depicts aspects of an example processing system 1300.

The processing system 1300 includes a processing system 1302 including one or more processors 1320. The one or more processors 1320 are coupled to a computer-readable medium/memory 1330 via a bus 1306. In certain aspects, the computer-readable medium/memory 1330 is configured to store instructions (e.g., computer-executable code) that when executed by the one or more processors 1320, cause the one or more processors 1320 to perform the method 1100 described with respect to FIG. 11, or any aspect related to it, including any additional steps or sub-steps described in relation to FIG. 11. The processing system 1300 may further include one or more of a display (e.g., configured to display a user interface), a modem (e.g., configured to modulate data, such as image data, on a carrier wave), and one or more antennas (e.g., configured to transmit and/or receive data, such as in conjunction with the modem.

In the depicted example, computer-readable medium/memory 1330 stores code (e.g., executable instructions) for receiving a text prompt 1331, code for providing a user interface 1332, code for receiving input 1333, and code for generating an output image 1334. Processing of the code 1331-1334 may enable and cause the processing system 1300 to perform the method 1100 described with respect to FIG. 11, or any aspect related to it.

The one or more processors 1320 include circuitry configured to implement (e.g., execute) the code stored in the computer-readable medium/memory 1330, including circuitry for receiving a text prompt 1321, circuitry for providing a user interface 1322, circuitry for receiving input 1323, and circuitry for generating an output image 1324. Processing with circuitry 1321-1324 may enable and cause the processing system 1300 to perform the method 1100 described with respect to FIG. 11, or any aspect related to it.

Example Clauses

Implementation examples are described in the following numbered clauses:

Clause 1: A method for generating an output image based on a text prompt, comprising: obtaining the text prompt; encoding the text prompt into a plurality of conditioning tokens; for each of one or more patches of a latent image representation: calculating a respective plurality of cross-attention weights corresponding to the plurality of conditioning tokens based on the patch as a query and the plurality of conditioning tokens as a key; and modifying a maximum value cross-attention weight among the respective plurality of cross-attention weights to generate a modified respective plurality of cross-attention weights; performing an iteration of denoising using the modified respective plurality of cross-attention weights for each of the one or more patches to obtain a modified latent image representation; and generating the output image based on the modified latent image representation.

Clause 2: A method in accordance with clause 1, wherein modifying the maximum value cross-attention weight among the respective plurality of cross-attention weights comprises reducing the maximum value cross-attention weight.

Clause 3: A method in accordance with any one of clauses 1-2, wherein modifying the maximum value cross-attention weight among the respective plurality of cross-attention weights comprises multiplying the maximum value cross-attention weight by a negative scalar value.

Clause 4: A method in accordance with clause 3, further comprising receiving the negative scalar values as a user-specified parameter.

Clause 5: A method in accordance with any one of clauses 1-4, wherein modifying the maximum value cross-attention weight among the respective plurality of cross-attention weights comprises setting the maximum value cross-attention weight to zero.

Clause 6: A method in accordance with any one of clauses 1-5, further comprising performing one or more initial denoising iterations using classifier-free guidance prior to performing the iteration of denoising using the modified respective plurality of cross-attention weights for each of the one or more patches.

Clause 7: A method in accordance with any one of clauses 1-6, further comprising: displaying a user interface configured to receive input indicative of an emphasis strength associated with one or more words of the text prompt, wherein the emphasis strength controls an amount to modify the maximum value cross-attention weight among the respective plurality of cross-attention weights.

Clause 8: A method in accordance with clause 7, further comprising: displaying one or more interface elements configured to receive the input on the user interface, the one or more interface elements including at least one of a slider, a numerical input, or a keyword highlight.

Clause 9: A method in accordance with any one of clauses 1-8, further comprising: for each of one or more patches of the modified latent image representation: calculating a respective second plurality of cross-attention weights corresponding to the plurality of conditioning tokens based on the patch as another query and the plurality of conditioning tokens as another key; and modifying another maximum value cross-attention weight among the respective second plurality of cross-attention weights to generate another modified respective plurality of second cross-attention weights; and performing a second iteration of denoising using the modified respective plurality of second cross-attention weights for each of the one or more patches of the modified latent image representation to obtain a second modified latent image representation, wherein to generate the output image based on the modified latent image representation comprises to decode the second modified latent image representation using a decoder to generate the output image.

Clause 10: A method in accordance with any one of clauses 1-9, further comprising displaying the output image at a display.

Clause 11: A method in accordance with any one of clauses 1-10, further comprising modulating, by a modem, one or more carrier wave signals with data indicative of the output image.

Clause 12: A method in accordance with clause 11, further comprising transmitting, by one or more antennas, the one or more carrier wave signals to a device.

Clause 13: A method in accordance with any one of clauses 1-12, wherein performing the iteration of denoising comprises: generating a first output based on the latent image representation and the respective plurality of cross-attention weights for each of the one or more patches of the latent image representation; generating a second output based on the latent image representation and the modified respective plurality of cross-attention weights for each of the one or more patches of the latent image representation; and subtracting the second output from the first output to obtain the modified latent image representation.

Clause 14: A method in accordance with any one of clauses 1-13, wherein performing the iteration of denoising comprises generating the modified latent image representation based on the latent image representation and the modified respective plurality of cross-attention weights for each of the one or more patches of the latent image representation.

Clause 15: A method for generating an output image based on a text prompt, comprising: receiving the text prompt; providing a user interface comprising one or more input elements associated with one or more words of the text prompt; receiving input corresponding to at least one of the one or more input elements, the input indicating a semantic importance for each of at least one of the one or more words associated with the at least one of the one or more input elements; and generating the output image based on the text prompt and the input.

Clause 16: A method in accordance with clause 15, further comprising displaying the user interface at a display; and displaying the output image at the display.

Clause 17: A method in accordance with any one of clauses 15-16, wherein generating the output image comprises generating the output image using the text prompt and the input as inputs to a generative artificial intelligence (AI) model.

Clause 18: A method in accordance with any one of clauses 15-17, wherein a first input element of the one or more input elements is a slider element configured to increase or decrease the importance of a first word of the one or more words.

Clause 19: A method in accordance with any one of clauses 15-18, wherein a first input element of the one or more input elements is a dial element configured to increase or decrease the importance of a first word of the one or more words.

Clause 20: A method in accordance with any one of clauses 15-19, further comprising modifying an appearance of the at least one of the one or more words based on the indicated semantic importance.

Clause 21: A method in accordance with clause 20, where modifying the appearance of the at least one of the one or more words comprises highlighting the at least one of the one or more words.

Clause 22: A method in accordance with any one of clauses 15-21, wherein the output image emphasizes one or more objects associated with the at least one of the one or more words indicated as having higher semantic importance as compared to other words of the one or more words.

Clause 23: A method in accordance with any one of clauses 15-22, further comprising: displaying, at a display, a first image associated with the text prompt prior to receiving the input; and displaying, at the display, after receiving the input.

Clause 24: A method in accordance with clause 23, further comprising displaying, by the display, a transition from the first image to the output image.

Clause 25: A method in accordance with clause 23, wherein the output image emphasizes one or more objects associated with the at least one of the one or more words as compared to the one or more objects in the first image.

Clause 26: A method in accordance with clause 23, further comprising: generating the first image using the text prompt as input to a generative artificial intelligence (AI) model, wherein generating the output image comprises generating the output image using the text prompt and the input as inputs to the generative AI model.

Clause 27: A method in accordance with any one of clauses 15-26, further comprising: encoding the text prompt into a plurality of conditioning tokens; for each of one or more patches of a latent image representation: calculating a respective plurality of cross-attention weights corresponding to the plurality of conditioning tokens based on the patch as a query and the plurality of conditioning tokens as a key; and modifying a maximum value cross-attention weight among the respective plurality of cross-attention weights to generate a modified respective plurality of cross-attention weights; and performing an iteration of denoising using the modified respective plurality of cross-attention weights for each of the one or more patches to generate the output image.

Clause 28: A method in accordance with clause 27, further comprising modifying at least one cross-attention weight among the respective plurality of cross-attention weights based on the indicated semantic importance.

Clause 29: An apparatus, comprising: one or more memories (e.g., comprising executable instructions); and one or more processors, coupled to the one or more memories, configured to (e.g., execute the executable instructions and) (e.g., cause the apparatus to) perform a method in accordance with any one of clauses 1-28.

Clause 30: An apparatus, comprising means for performing a method in accordance with any one of clauses 1-28.

Clause 31: A non-transitory computer-readable medium storing program code for causing a processing system to perform the steps of any one of clauses 1-28.

Clause 32: A computer program product embodied on a computer-readable storage medium comprising code for performing a method in accordance with any one of clauses 1-28.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In a particular embodiment, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus configured to generate an output image based on a text prompt, comprising:

one or more memories configured to store a latent image representation; and one or more processors, coupled to the one or more memories, configured to:

obtain the text prompt;

encode the text prompt into a plurality of conditioning tokens;

for each of a plurality of patches of the latent image representation:

calculate a respective plurality of cross-attention weights corresponding to the plurality of conditioning tokens based on the patch as a query and the plurality of conditioning tokens as a key; and modify a maximum value cross-attention weight among the respective plurality of cross-attention weights to generate a modified respective plurality of cross-attention weights;

perform an iteration of denoising using the modified respective plurality of cross-attention weights for each of the plurality of patches to obtain a modified latent image representation; and generate the output image based on the modified latent image representation.

2. The apparatus of claim 1, wherein to modify the maximum value cross-attention weight among the respective plurality of cross-attention weights comprises to reduce the maximum value cross-attention weight.

3. The apparatus of claim 1, wherein to modify the maximum value cross-attention weight among the respective plurality of cross-attention weights comprises to multiply the maximum value cross-attention weight by a negative scalar value.

4. The apparatus of claim 3, wherein the one or more processors are configured to receive the negative scalar value as a user-specified parameter.

5. The apparatus of claim 1, wherein to modify the maximum value cross-attention weight among the respective plurality of cross-attention weights comprises to set the maximum value cross-attention weight to zero.

6. The apparatus of claim 1, wherein the one or more processors are configured to perform one or more initial denoising iterations using classifier-free guidance prior to performing the iteration of denoising using the modified respective plurality of cross-attention weights for each of the plurality of patches.

7. The apparatus of claim 1, further comprising a display, coupled to the one or more processors, configured to display a user interface configured to receive input indicative of an emphasis strength associated with one or more words of the text prompt, wherein the emphasis strength controls an amount to modify the maximum value cross-attention weight among the respective plurality of cross-attention weights.

8. The apparatus of claim 7, wherein the user interface includes one or more interface elements configured to receive the input, the one or more interface elements including at least one of a slider, a numerical input, or a keyword highlight.

9. The apparatus of claim 1, wherein the one or more processors are configured to:

for each of a plurality of patches of the modified latent image representation:

calculate a respective second plurality of cross-attention weights corresponding to the plurality of conditioning tokens based on the patch as another query and the plurality of conditioning tokens as another key; and modify another maximum value cross-attention weight among the respective second plurality of cross-attention weights to generate another modified respective plurality of second cross-attention weights; and perform a second iteration of denoising using the modified respective plurality of second cross-attention weights for each of the plurality of patches of the modified latent image representation to obtain a second modified latent image representation, wherein to generate the output image based on the modified latent image representation comprises to decode the second modified latent image representation using a decoder to generate the output image.

10. The apparatus of claim 1, further comprising a display, coupled to the one or more processors, configured to display the output image.

11. The apparatus of claim 1, further comprising:
a modem, coupled to the one or more processors, configured to modulate one or more carrier wave signals with data indicative of the output image.

12. The apparatus of claim 11, further comprising:
one or more antennas, coupled to the modem, configured to transmit the one or more carrier wave signals to a device.

13. The apparatus of claim 1, wherein to perform the iteration of denoising, the one or more processors are configured to:
generate a first output based on the latent image representation and the respective plurality of cross-attention weights for each of the plurality of patches of the latent image representation;
generate a second output based on the latent image representation and the modified respective plurality of cross-attention weights for each of the plurality of patches of the latent image representation; and
subtract the second output from the first output to obtain the modified latent image representation.

14. The apparatus of claim 1, wherein to perform the iteration of denoising, the one or more processors are configured to:
generate the modified latent image representation based on the latent image representation and the modified respective plurality of cross-attention weights for each of the plurality of patches of the latent image representation.

15. An apparatus configured to generate an output image based on a text prompt, comprising:
one or more memories configured to store the output image; and
one or more processors, coupled to the one or more memories, configured to:
receive the text prompt;
provide a user interface comprising one or more input elements associated with one or more words of the text prompt;
receive input corresponding to at least one of the one or more input elements, the input indicating a semantic importance for each of at least one of the one or more words associated with the at least one of the one or more input elements; and
generate the output image based on the text prompt and the input.

16. The apparatus of claim 15, further comprising a display, coupled to the one or more processors, configured to:
display the user interface; and
display the output image.

17. The apparatus of claim 15, wherein to generate the output image, the one or more processors are configured to generate the output image using the text prompt and the input as inputs to a generative artificial intelligence (AI) model.

18. The apparatus of claim 15, wherein a first input element of the one or more input elements is a slider element configured to increase or decrease the importance of a first word of the one or more words.

19. The apparatus of claim 15, wherein a first input element of the one or more input elements is a dial element configured to increase or decrease the importance of a first word of the one or more words.

20. The apparatus of claim 15, wherein the one or more processors are configured to modify an appearance of the at least one of the one or more words based on the indicated semantic importance.

21. The apparatus of claim 20, wherein to modify the appearance of the at least one of the one or more words comprises to highlight the at least one of the one or more words.

22. The apparatus of claim 15, wherein the output image emphasizes one or more objects associated with the at least one of the one or more words indicated as having higher semantic importance as compared to other words of the one or more words.

23. The apparatus of claim 15, further comprising a display, coupled to the one or more processors, configured to:
prior to the one or more processors receiving the input, display a first image associated with the text prompt; and
after the one or more processors receiving the input, display the output image.

24. The apparatus of claim 23, wherein the display is configured to:
display a transition from the first image to the output image.

25. The apparatus of claim 23, wherein the output image emphasizes one or more objects associated with the at least one of the one or more words as compared to the one or more objects in the first image.

26. The apparatus of claim 23, wherein:
the one or more processors are configured to generate the first image using the text prompt as input to a generative artificial intelligence (AI) model; and
to generate the output image, the one or more processors are configured to generate the output image using the text prompt and the input as inputs to the generative AI model.

27. The apparatus of claim 15, wherein the one or more processors are configured to:
encode the text prompt into a plurality of conditioning tokens;
for each of one or more patches of a latent image representation:
calculate a respective plurality of cross-attention weights corresponding to the plurality of conditioning tokens based on the patch as a query and the plurality of conditioning tokens as a key; and
modify a maximum value cross-attention weight among the respective plurality of cross-attention weights to generate a modified respective plurality of cross-attention weights; and
perform an iteration of denoising using the modified respective plurality of cross-attention weights for each of the one or more patches to generate the output image.

28. The apparatus of claim 27, wherein at least one cross-attention weight among the respective plurality of cross-attention weights is modified based on the indicated semantic importance.

29. A method comprising:
obtaining a text prompt;
encoding the text prompt into a plurality of conditioning tokens;

for each of a plurality of patches of a latent image representation:

calculating a respective plurality of cross-attention weights corresponding to the plurality of conditioning tokens based on the patch as a query and the plurality of conditioning tokens as a key; and modifying a maximum value cross-attention weight among the respective plurality of cross-attention weights to generate a modified respective plurality of cross-attention weights;

performing an iteration of denoising using the modified respective plurality of cross-attention weights for each of the plurality of patches to obtain a modified latent image representation; and generating an output image based on the modified latent representation.

30. A method comprising:

receiving a text prompt;

providing a user interface comprising one or more input elements associated with one or more words of the text prompt;

receiving input corresponding to at least one of the one or more input elements, the input indicating a semantic importance for each of at least one of the one or more words associated with the at least one of the one or more input elements; and generating an output image based on the text prompt and the input.

\* \* \* \* \*